US008059501B2

(12) United States Patent
Bakx et al.

(10) Patent No.: US 8,059,501 B2
(45) Date of Patent: Nov. 15, 2011

(54) OPTICAL DISK DRIVE FOR SCANNING AN OPTICAL DISK WITH A SCANNING VELOCITY AND METHOD FOR SCANNING AN OPTICAL DISK WITH A SCANNING VELOCITY

(75) Inventors: Johannes Leopoldus Bakx, Eindhoven (NL); Antoon Dekker, Eindhoven (NL); Maarten Kuijper, Helmond (NL); Tony P. van Endert, Lommel (BE)

(73) Assignee: Lite-On It Corporation, Taipei (TW)

( * ) Notice: Subject to any disclaimer, the term of this patent is extended or adjusted under 35 U.S.C. 154(b) by 698 days.

(21) Appl. No.: 12/141,688

(22) Filed: Jun. 18, 2008

(65) Prior Publication Data

US 2009/0316549 A1    Dec. 24, 2009

(51) Int. Cl.
*G11B 7/00* (2006.01)
(52) U.S. Cl. ............. 369/44.27; 369/47.39; 369/47.55
(58) Field of Classification Search .............. None
See application file for complete search history.

(56) References Cited

U.S. PATENT DOCUMENTS

| 2004/0004923 A1* | 1/2004 | Hirai et al. | 369/53.28 |
| 2006/0256684 A1* | 11/2006 | Katayama | 369/47.36 |

* cited by examiner

*Primary Examiner* — Wayne Young
*Assistant Examiner* — Brian Butcher
(74) *Attorney, Agent, or Firm* — Thomas, Kayden, Horstemeyer & Risley, LLP

(57) ABSTRACT

An optical disk drive and a method for scanning an optical disk that includes a substantially circular track with a scanning velocity is provided. A servo control signal (SCS) is determined based on a servo error signal (SES). A first performance indicator (IND1) of the servo actuator is determined from at least one of the SES and SCS. IND1 is compared against a first pre-determined threshold (ITHR1), determining a first servo margin (MAR1). The scanning velocity is set in dependence on at least MAR1. In particular, scanning velocity is reduced when the first performance indicator exceeds the first pre-determined threshold. Additionally or alternatively, a bandwidth of control of the servo actuator can be adjusted in dependence on at least one of a second servo margin, determined from at least one of SES and SCS, and a third servo margin, associated with a mark quality determined from a central aperture signal.

25 Claims, 15 Drawing Sheets

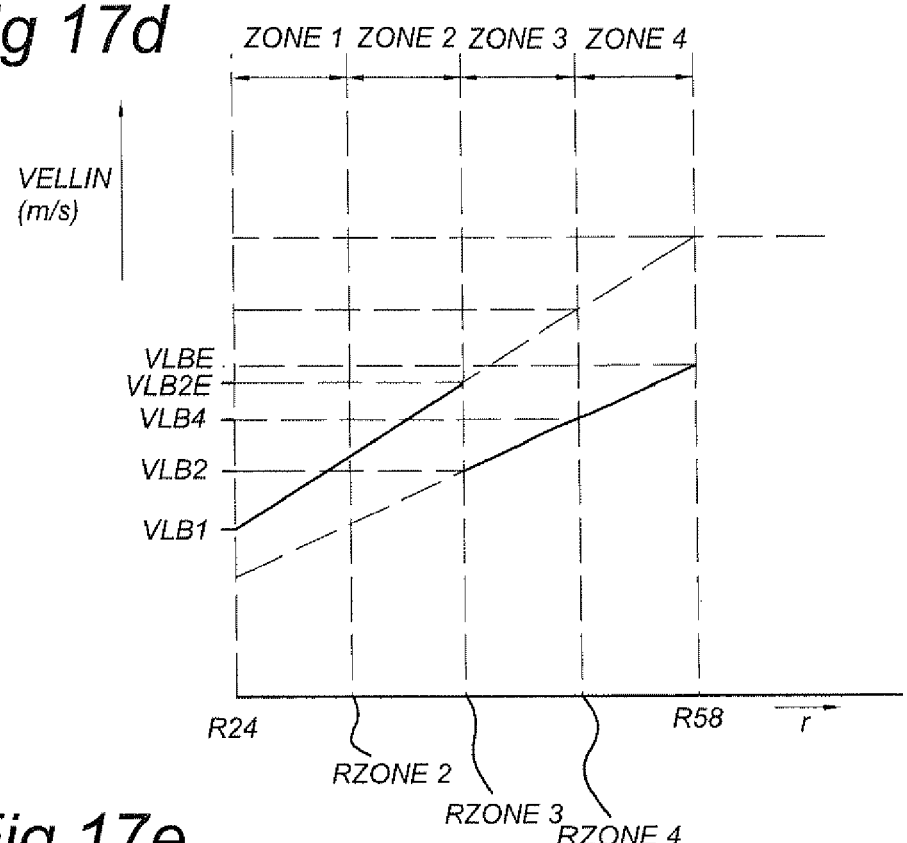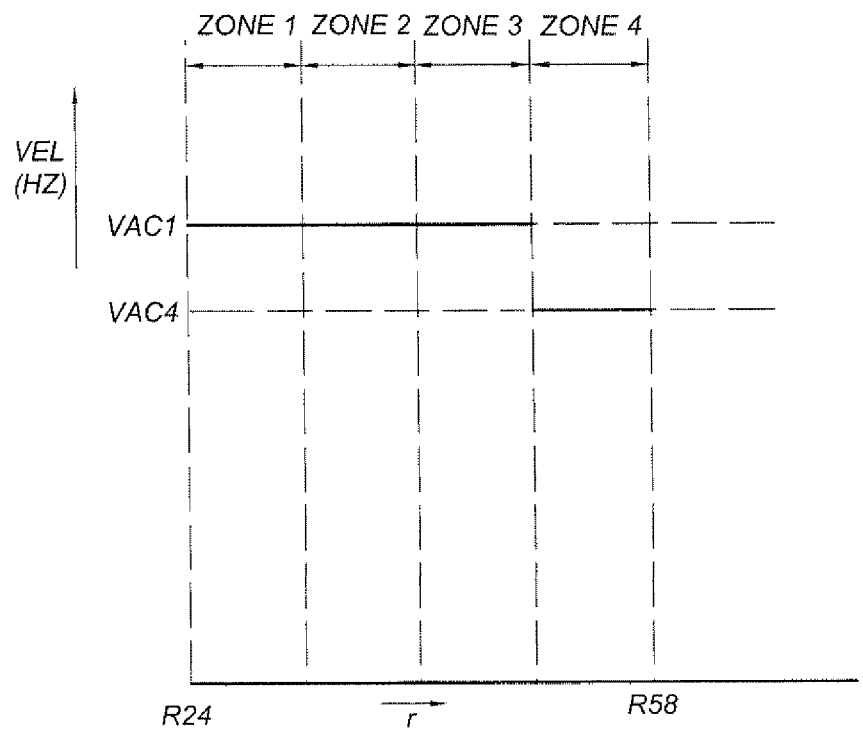

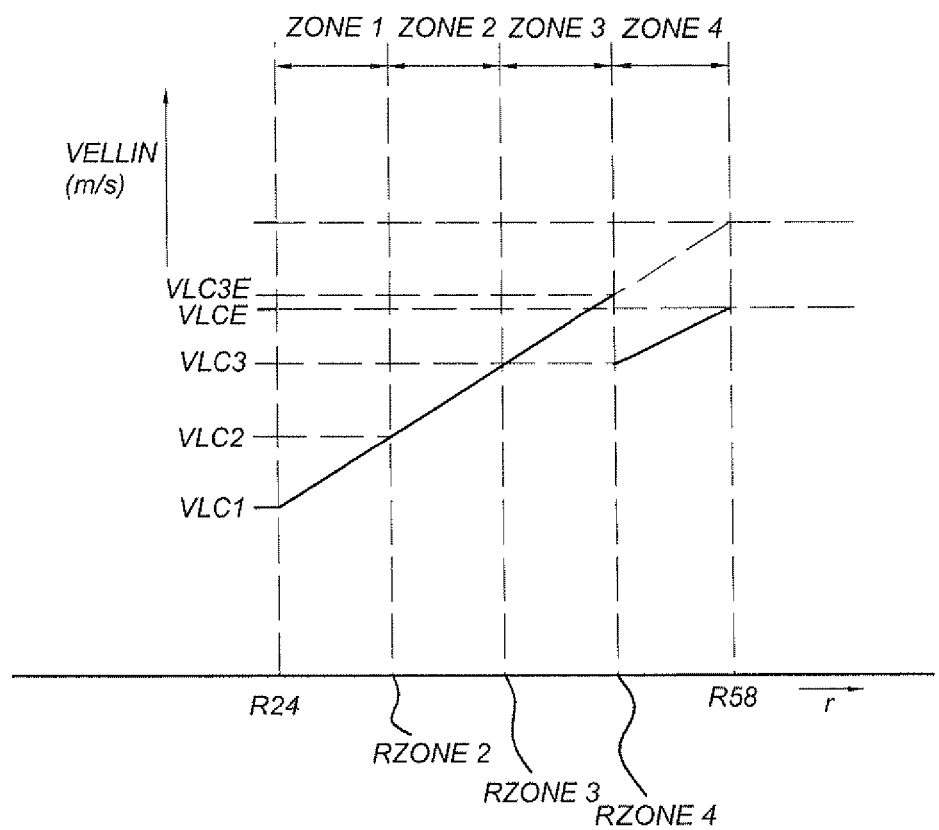

OPTICAL DISK DRIVE FOR SCANNING AN OPTICAL DISK WITH A SCANNING VELOCITY AND METHOD FOR SCANNING AN OPTICAL DISK WITH A SCANNING VELOCITY

FIELD

The invention relates to an optical disk drive for scanning an optical disk comprising a substantially circular track with a scanning velocity. The invention further relates to a method for scanning an optical disk comprising a substantially circular track an optical disk comprising a substantially circular track for use with an optical disk drive.

BACKGROUND

An optical disc drive is provided with a lens-actuator that keeps a laser spot in focus on an information layer of an optical disk and tracks the spot on the track on the optical disk for scanning the optical disk. This lens-actuator usually comprises a focus actuator and a tracking actuator, also called radial actuator, which are controlled by a focus actuator controller with a focus control bandwidth and a tracking actuator controller with a tracking control bandwidth. Each of these controllers cooperates with an optical spot position detector that measures a defocus and a de-tracking of the laser spot and controls the actuator to position the laser spot relative to the information layer and relative to the track.

For higher scanning speeds, requirements as to the performance of the actuators and the controllers become increasingly difficult to meet. E.g., a higher control bandwidth and/or a higher sensitivity may be required for focussing and tracking at high speeds. Moreover, optical disks show large differences in disk quality, e.g. in disk warp, eccentricity and local track acceleration errors. As a result, some disks are relatively easy to focus and track even with a moderate bandwidth or at high speeds, whereas other disks are hard to focus and track and would require a high bandwidth or a high sensitivity especially at high speeds.

However, there are several potential problems associated with operation of the actuator for focussing and tracking at high speeds.

E.g., due to dynamical characteristics of the actuator, the control loops are limited in bandwidth to achievable practical bandwidths up to about 8 kHz, which is generally too low for Blue-Ray disks at speeds of 4× and higher.

Even if the servo bandwidth is sufficient, it may happen that the actuator must make large excursions at high frequencies, e.g. to compensate for disk warp or eccentricity at high rotational speeds. Such disturbances can be corrected e.g. using feed-forward control using a memory loop, so that a high loop bandwidth is not required. However, the dissipation in the coils of the actuator may become unacceptable under such conditions.

In order to correct for high-frequency disturbances, and especially local acceleration errors in the axial or radial direction, the actuator must be able to provide sufficient acceleration. If this is not the case, the output of the servo driver may saturate at a maximum available voltage, and the residual error becomes too high, with the risk that even a focus loss or track loss might occur. The achievable acceleration at a maximum available voltage may also be referred to as the sensitivity of the actuator.

In a practical situation one or more of these problems may occur during reading or writing of a disk at a high speed. However, very often no problems occur at all. Whether a problem occurs or not depends very much on the characteristics of the disk at hand. Although optical disks are standardized with a plurality of disk standards, and each disk standard specifies maximum values for disk warp, eccentricity and acceleration errors, this does not mean that these maximum values will occur on each individual disk. In fact, the worst-case conditions described in the standard are often based on unjustified concerns for low yield, and agreed upon long before any real production data is available. The result is that the error values found in practice are often much lower than allowed by the disk standard.

SUMMARY

The present invention aims to improve the scanning of an optical disk with an optical disk drive depending on the characteristics of the optical disk and the limitations of the actuator as mentioned above.

This aims to result in a situation where a large number of optical disks are well-scanned with the optical disk drive, and only a small number of optical disks can not be scanned with the optical disk drive.

In an aspect, the present invention aims to maximize the scanning speed depending on the characteristics of the optical disk at hand and the limitations of the actuator.

This aims to result in a situation where a large number of drive-disk combinations in the market achieve a maximum targeted speed, even if the drive can formally not cope with all the worst-case conditions mentioned in the disk standard. Similarly, if the drive can handle the worst-case conditions of the standard, out-of-spec disks can be tested for operation at the target speed.

In an aspect, the present invention aims to optimize the scanning accuracy depending on the characteristics of the optical disk at hand and the limitations of the actuator.

This aims to result in a situation where a large number of optical disks are scanned with a high accuracy with the optical disk drive, and only a small number of optical disks is scanned with a relatively poor accuracy or can not be scanned at all.

Hereto the optical disk drive according to the present invention comprises:
  an optical source for generating an incident beam,
  an optical arrangement for focusing the incident beam into a spot on the optical disk,
  a disk speed controller for moving the optical disk with the scanning velocity relative to the spot,
  a servo system for controlling the position of the spot relative to the optical disk,
  a sensor for sensing a reflected beam produced by the optical disk upon receiving the incident beam, and for producing a sensor output signal comprising at least a servo error signal,
  the servo system comprising a servo controller and a servo actuator, and
  the servo controller being arranged to:
    receive the servo error signal,
    determine a first performance indicator of the servo actuator in dependence on at least the servo error signal,
    compare the first performance indicator against a first predetermined threshold for determining a first servo margin, and
    set the scanning velocity in dependence on at least the first servo margin.

In a further embodiment, the servo controller is further arranged to:
  determine a servo control signal in dependence on the servo error signal, control the servo actuator in dependence on the servo control signal, and perform the determining of the first performance indicator of the servo actuator while controlling the servo actuator with the servo control signal.

In a further embodiment, the servo controller is arranged to perform the determining of the first performance indicator from the servo control signal.

The servo error signal may be a focus error signal. The first error signal may be a tracking error signal, such as a radial push-pull signal or alternatively a differential phase detection signal.

The servo control signal may be a digital signal in a digital control loop implemented in the servo system, or an analogue drive signal directly driving the servo actuator. The control may be of a feed-back or alternatively of a feed-forward type. The control may be of a hybrid type, using a feed-forward type for low-frequency components (such as generated from disk eccentricity) and a feed-back type for high-frequency components (such as generated from local disturbances or e.g. non-roundness of the track).

The situation that the servo actuator is not controlled in dependence on the servo control signal determined from the servo error signal may be further referred to as an open-loop situation or an open-loop servo. The situation that the servo actuator is controlled in dependence on the servo control signal may be further referred to as closed-loop situation or a closed-loop servo.

The servo actuator may comprise a coil driven from the servo control signal and acting on a magnetic element for moving at least part of the optical arrangement in an axial direction for focussing on the optical disk or in a radial direction for tracking the track on the optical disk.

The first performance indicator may be derived from e.g. measuring a residual servo error signal in the closed-loop situation. A large residual servo error may indicate that the bandwidth of the control of the servo actuator is insufficient, e.g. due to limitations to dynamical characteristics of the actuator.

The first performance indicator may be derived from e.g. measuring a number of zero-crossings of the servo error signal in the open-loop situation. A large number of zero-crossings may indicate that the optical disk has a large eccentricity, thus requiring a large fraction of the available control range and consuming e.g. a large fraction of the amplitude of servo control signal. This may be indicate a large dissipation in the actuator when the servo loop would be closed at this scanning speed. This may indicate that there is too little amplitude available for correcting e.g. local deviations or effects external shocks.

The first performance indicator may be derived from e.g. measuring an amplitude of the servo control signal during closed-loop control. Local acceleration errors may be too large for the actuator to provide sufficient acceleration, causing the servo control signal to saturate at a maximum available level, e.g. a maximum available voltage. The residual servo error signal may then become too high and the focussing or tracking may be frustrated, resulting in a loss of focus or a loss of track respectively.

The first performance indicator may be derived from e.g. measuring a measure indicative for a power dissipation of the servo control signal during closed-loop control. The measure for the power dissipation of the servo control signal during closed-loop control may e.g. be a root-mean-square average of the amplitude of the servo control signal. The power dissipation may become unacceptably high e.g. when the disk has a large eccentricity.

Comparing first performance indicator against a pre-determined threshold may thus be used for obtaining a measure of the available servo margin, if any. The pre-determined threshold may e.g. be a maximum allowable residual servo error signal, a maximum allowable amplitude of the servo control signal, or a maximum allowable power dissipation.

When the available servo margin with the optical disk at hand in the optical disk drive at the used scanning velocity is too small, the scanning velocity may be reduced to a scanning velocity that provides sufficient margin.

Determining the first performance indicator and comparing the first performance indicator against the first pre-determined threshold for determining the first servo margin may further be referred to as monitoring the first servo performance.

In a further embodiment, the servo controller may be arranged to:
determine a plurality of first performance indicators of the servo actuator from at least one of the servo error signal and the servo control signal,
compare each of the plurality of first performance indicators against a corresponding first pre-determined threshold from a plurality of first pre-determined thresholds for determining a plurality of first servo margins, and
set the scanning velocity in dependence on at least the plurality of first servo margins.

Monitoring is thus performed on a plurality of first performance indicators together, e.g. on the power dissipation, the residual servo error and the peak servo control amplitude.

In an embodiment, the optical disk drive is further comprising:
a further servo system for further controlling the position of the spot relative to the optical disk,
the sensor output signal is further comprising at least a further servo error signal,
the further servo system comprising a further servo controller and a further servo actuator, and
the further servo controller being arranged to:
receive the further servo error signal,
determine a further servo control signal in dependence on the further servo error signal, while the servo system is controlling the servo actuator with the servo control signal,
control the further servo actuator in dependence on the further servo control signal,
determine a further performance indicator of the further servo actuator from at least one of the further servo error signal and the further servo control signal,
compare the further performance indicator against a further pre-determined threshold for determining a further servo margin, and
set the scanning velocity in dependence on at least the further servo margin.

The further servo controller may thus, e.g., reduce the scanning velocity further, based on the further servo margin, after the servo controller has set the scanning velocity based on the first servo margin, when the scanning velocity results in insufficient servo margin for the further servo controller.

The servo system may e.g. be a focus servo system for focusing the spot on the optical disk and the further servo system may e.g. be a radial tracking servo system for tracking the track on the optical disk with the spot while the spot is focused on the optical disk.

Monitoring may be performed while reading the optical disk. Monitoring may be performed while writing data onto the optical disk. Monitoring may be performed while tracking the optical disk at a read power before writing data onto the optical disk.

In an embodiment, the servo error signal is a focus error signal and determining the first performance indicator is performed before the spot is focused on the disk.

E.g., the focus actuator may perform a scan perpendicular to the disk to determine disk warp from the focus error signal, by effectively measuring the_axial position of the information layer.

In an embodiment, the servo error signal is a focus error signal and determining the first performance indicator is performed while the spot is focused on the disk.

This employs the residual focus error signal and allows to detect deviations from the optimal focus position.

In an embodiment, the servo control signal is a focus control signal and determining the first performance indicator is performed while the spot is focused on the disk.

The focus control signal may e.g. be used to estimate the power dissipation of the focus actuator, or to measure the amplitude of the focus control signal.

In an embodiment, the servo error signal is a tracking error signal and determining the first performance indicator is performed while the spot is focused on the disk and before tracking the track.

E.g., from counting the number of zero-crossings of the open-loop tracking error signal, disc eccentricity may be estimated.

In an embodiment, the servo error signal is a tracking error signal and determining the first performance indicator is performed while the spot is focused on the disk and tracking the track.

This employs the residual radial error signal and allows to detect deviations from the optimal tracking position.

In an embodiment, the servo control signal is a tracking control signal and determining the first performance indicator is performed while the spot is focused on the disk and tracking the track.

In an embodiment, determining the first performance indicator is performed while the spot is focused at a read power level.

In an embodiment, the optical disk is scanned for writing marks on the optical disk, only after setting the scanning velocity in dependence on at least the first servo margin.

In an embodiment, determining the first performance indicator and comparing the first performance indicator against the first pre-determined threshold for determining the first servo margin
is also performed while the optical disk is scanned for writing marks on the optical disk, and
writing marks on the optical disk at the scanning velocity is stopped when the first servo margin is within a pre-determined alarm range.

Thus, when the optical disk drive performs the testing at read conditions, the actuator runs into its limits during writing.

In an embodiment, the optical disk drive is further arranged to, after the optical disk is scanned for writing marks on the optical disk:
determine a mark quality of the marks,
compare the mark quality against a pre-determined mark quality threshold for determining a mark-related servo margin, and
reduce the scanning velocity in dependence on the mark-related servo margin.

In an embodiment, the first performance indicator is associated with a bandwidth of the servo system.

The first performance indicator may then be the residual servo error signal, and the first pre-determined threshold may then be a maximum allowable residual servo error signal.

In a further embodiment, the first performance indicator is determined from the servo error signal (FE; TE) while the servo actuator is controlled in dependence on the servo control signal.

The first pre-determined threshold may correspond to a maximum allowable residual servo error signal during closed-loop control.

In an embodiment, the first performance indicator is associated with a dissipation of the servo actuator. The first performance indicator may be derived from determining a power or RMS of the servo control signal.

E.g., when the servo actuator comprises a first electromagnetic coil operable for moving at least part of the optical arrangement, the first performance indicator is associated the dissipation in the coil of the actuator.

In a further embodiment, the first performance indicator is determined from the servo control signal while the servo actuator is controlled in dependence on the servo control signal.

The first pre-determined threshold may correspond to a maximum allowable power content of the servo control signal.

In an embodiment, the first performance indicator is associated with a sensitivity of the servo actuator.

The sensitivity of the servo actuator is the acceleration produced by the servo actuator in $m/s^2$ per V input voltage. The amplitude of the servo control signal is thus indicative whether the servo actuator has a sufficient sensitivity and can provide sufficient acceleration.

In a further embodiment, the first performance indicator is determined from an amplitude of the servo control signal while the servo actuator is controlled in dependence on the servo control signal.

The first performance indicator may be a peak vaue of the amplitude of the servo control signal.

The first pre-determined threshold may correspond to a maximum allowable amplitude of the servo control signal.

In alternative further embodiments, the first performance indicator is determined from the servo error signal (SES) without controlling the servo actuator in dependence on the servo control signal.

E.g., the first performance indicator may be the number of zero-crossings of the servo error signal within one disk revolution, and the first pre-determined threshold may correspond to a maximum number of zero-crossings of the servo error signal (FE; TE), relating to a maximum allowable amplitude of the servo control signal when the loop would be closed.

In an embodiment, a plurality of zones is defined on the optical disk and
determining the first performance indicator, comparing the first performance indicator against the first pre-determined threshold for determining the first servo margin and setting the scanning velocity in dependence on at least the first servo margin
is performed for each zone.

As the optical disk may be written in CAV mode with a constant angular scanning velocity for preventing spin-up spin-down losses, the linear scanning velocity may be very different over the whole disk area. E.g., the linear scanning velocity increases with a factor 2.4 from the inner radius of 24 mm to the outer radius of 58 mm on the optical disk. It may thus be required to monitor the servo performance and set the scanning velocity while moving over the disk area.

As an example, 10 zones may be used about the 35 mm radius the inner radius of 24 mm to the outer radius of 58 mm.

The plurality of zones may be restricted to a part of the disk only. The plurality may be varied real-time, e.g. starting at the inner radius and adding a new zone when entering a new region on the disk, e.g. adding a zone at every 3.5 mm radius increase. The plurality may be dependent on the monitoring results, e.g. by increasing the number of zones when significant velocity adjustments are made.

In an embodiment,
  setting the scanning velocity in dependence on at least the first servo margin comprises setting the scanning velocity to a reduced scanning velocity, and
  the servo controller is further arranged to, after setting the scanning velocity to the reduced scanning velocity:
    determine the first performance indicator of the servo actuator again at the reduced scanning velocity,
    compare the first performance indicator against the first pre-determined threshold again for determining an amended servo margin, and
    set the scanning velocity in dependence on at least the amended servo margin.

The scanning velocity is thus further adjusted if the performance was still not within the first pre-determined threshold after having set the scanning velocity to the reduced scanning velocity.

In an embodiment, the first pre-determined threshold is associated with a first allowable performance of the servo system for scanning the optical disk with the scanning velocity.

E.g., when the first performance indicator is associated with a bandwidth of the servo system, the first performance pre-determined threshold is associated with a maximum allowable residual servo error signal, hence with a maximum allowable first servo error, e.g. a maximum allowable defocus position or a maximum allowable detracking position of the spot relative to the track.

E.g., when the first performance indicator is associated with a dissipation of the servo actuator, the first performance pre-determined threshold is associated with a maximum allowable dissipation of the servo actuator of the servo system, hence with a maximum allowable heat generation.

E.g., when the first performance indicator is associated with a sensitivity of the servo actuator, the first performance pre-determined threshold is associated with a maximum allowable local acceleration error for the servo system, still allowing to maintain a sufficiently low residual servo error also at the maximum available amplitude of the servo control signal.

In an embodiment, the servo controller is further arranged to:
  determine a second performance indicator of the servo actuator from at least one of the servo error signal and the servo control signal while controlling the servo actuator with the servo control signal,
  compare the second performance indicator against a second pre-determined threshold for determining a second servo margin, and
  set a bandwidth of the control of the servo actuator in dependence on at least the second servo margin.

The first and second performance indicators may be different indicators, e.g. the first associated with dissipation of the servo actuator and the second associated with a servo error signal residue. The second indicator may alternatively be the same indicator as the first performance indicator.

This may allow to, when a lower bandwidth is possible, use a lower bandwidth, e.g. to reduce dissipation or to have a more robust behavior against rapid disturbances in the servo error signal e.g. due to drop-outs.

This may allow to, when the bandwidth was not yet at its maximum and there is still sufficient servo margin, to increase the bandwidth until the bandwidth is at its limit.

In an embodiment, the second performance indicator is associated with at least one of:
  a bandwidth of the servo system,
  a dissipation of the servo actuator, and
  a sensitivity of the servo actuator.

As an example, the second performance indicator may be determined from at least one of:
  a residual error of the servo error signal,
  a dissipation of the servo actuator, and
  a peak servo control signal amplitude of the servo control signal.

In an embodiment, a plurality of zones is defined on the optical disk and
  determining the second performance indicator, comparing the second performance indicator against the second pre-determined threshold for determining the second servo margin and setting the bandwidth in dependence on at least the second servo margin
    is performed for each zone.

In an embodiment,
  the sensor output signal further comprises a central aperture signal, and
  the servo controller is further arranged to:
    determine a third performance indicator of the servo actuator from the central aperture signal while controlling the servo actuator with the servo control signal,
    compare the third performance indicator against a third pre-determined threshold for determining a third servo margin, and
    set a bandwidth of the control of the servo actuator in dependence on at least the third servo margin.

A large fluctuation of an envelope of the central aperture signal may be indicative for a too high or too low gain of the servo loop. E.g., when the gain is too high, high-frequent disturbances may incite the actuator to oscillate while writing or reading marks on the optical disk. Setting the gain of the bandwidth of the control of the servo actuator may be used to improve the recording or read-back quality.

In an embodiment, the third performance indicator is associated with at least one of:
  a mark quality of marks on the optical disk,
  a variation of a reflection level of the optical disk, and
  a variation of an envelope of the central aperture signal.

In an embodiment, a plurality of zones is defined on the optical disk and
  determining the third performance indicator, comparing the third performance indicator against the third pre-determined threshold for determining the third servo margin and setting the bandwidth in dependence on at least the third servo margin
    is performed for each zone In an embodiment, determining the third performance indicator is performed while the optical disk is scanned for writing marks on the optical disk.

Another aspect of the invention provides an optical disk drive for scanning an optical disk comprising a substantially circular track with a scanning velocity, the optical disk drive comprising:
  an optical source for generating an incident beam, an optical arrangement for focusing the incident beam into a spot on the optical disk, a disk speed controller for moving the optical disk with the scanning velocity relative to the spot, a servo system for controlling the position of the spot relative to the optical disk with a control bandwidth, a sensor for sensing a reflected beam produced by the optical disk upon receiving the incident beam, and for producing a sensor output signal comprising at least a servo error signal and a central aperture signal, the servo system comprising a servo controller and a servo actuator, and the servo controller being arranged to:

determine a performance indicator of the servo actuator from the central aperture signal while controlling the servo actuator with the servo control signal in dependence on the servo error signal, compare the performance indicator against a pre-determined threshold for determining a servo margin, and set the control bandwidth in dependence on at least the servo margin.

Another aspect of the invention provides a method for scanning an optical disk comprising a substantially circular track for use with an optical disk drive for scanning the optical disk, the method comprising:

generating an incident beam, focusing the incident beam into a spot on the optical disk, moving the optical disk with the scanning velocity relative to the spot, controlling the position of the spot relative to the optical disk using a servo actuator, sensing a reflected beam produced by the optical disk upon receiving the incident beam, and producing a sensor output signal comprising at least a servo error signal upon sensing the reflected beam, and receiving the servo error signal, determining a first performance indicator of the servo actuator in dependence on the servo error signal, comparing the first performance indicator against a first pre-determined threshold for determining a first servo margin, and setting the scanning velocity in dependence on at least the first servo margin.

In a further embodiment, the method further comprises:

determining a servo control signal in dependence on the servo error signal, controlling the servo actuator in dependence on the servo control signal, and performing the determining of the first performance indicator of the servo actuator while controlling the servo actuator with the servo control signal.

In a further embodiment, the method comprises performing the determining of the first performance indicator from the servo control signal.

In a further embodiment, the method comprises determining a second performance indicator of the servo actuator from at least one of the servo error signal and the servo control signal while controlling the servo actuator with the servo control signal, comparing the second performance indicator against a second pre-determined threshold for determining a second servo margin, and setting a bandwidth of the control of the servo actuator in dependence on the second servo margin.

In an embodiment of the method, for use with an optical disk drive wherein the sensor output signal further comprises a central aperture signal, the method further comprises:

determining a third performance indicator of the servo actuator from the central aperture signal while controlling the servo actuator with the servo control signal, comparing the third performance indicator against a third pre-determined threshold for determining a third servo margin, and setting a bandwidth of the control of the servo actuator in dependence on the third servo margin.

The invention further provides a computer program product arranged to be loaded in a processor and after being loaded allowing the processor to carry out one of the methods described above.

SHORT DESCRIPTION OF FIGURES

These and other aspects of the invention will be further elucidated and described in detail with reference to the drawings, in which corresponding reference symbols indicate corresponding parts:

FIG. 1a schematically shows the top-view of an optical disk;

Figure 2:
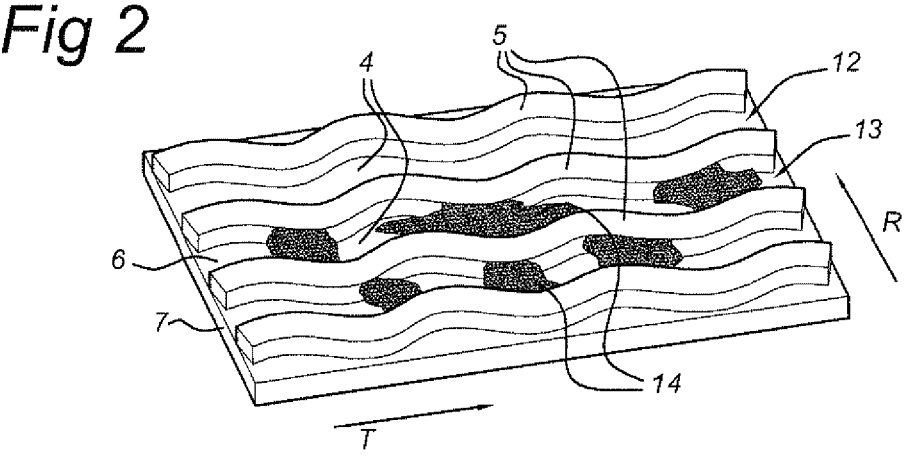
Figure 3:
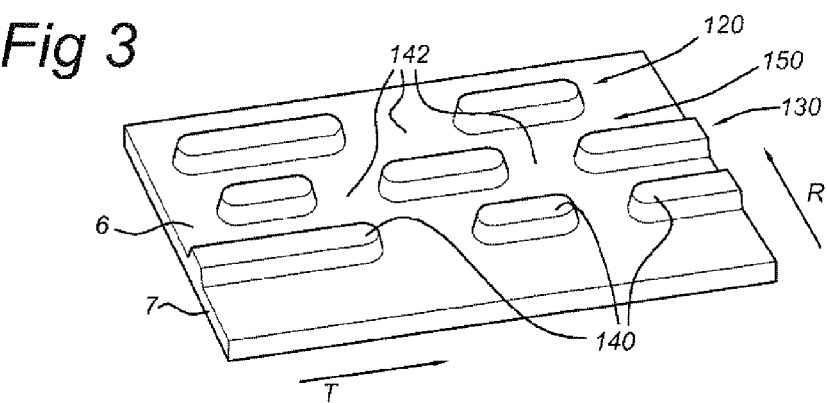
Figure 4:
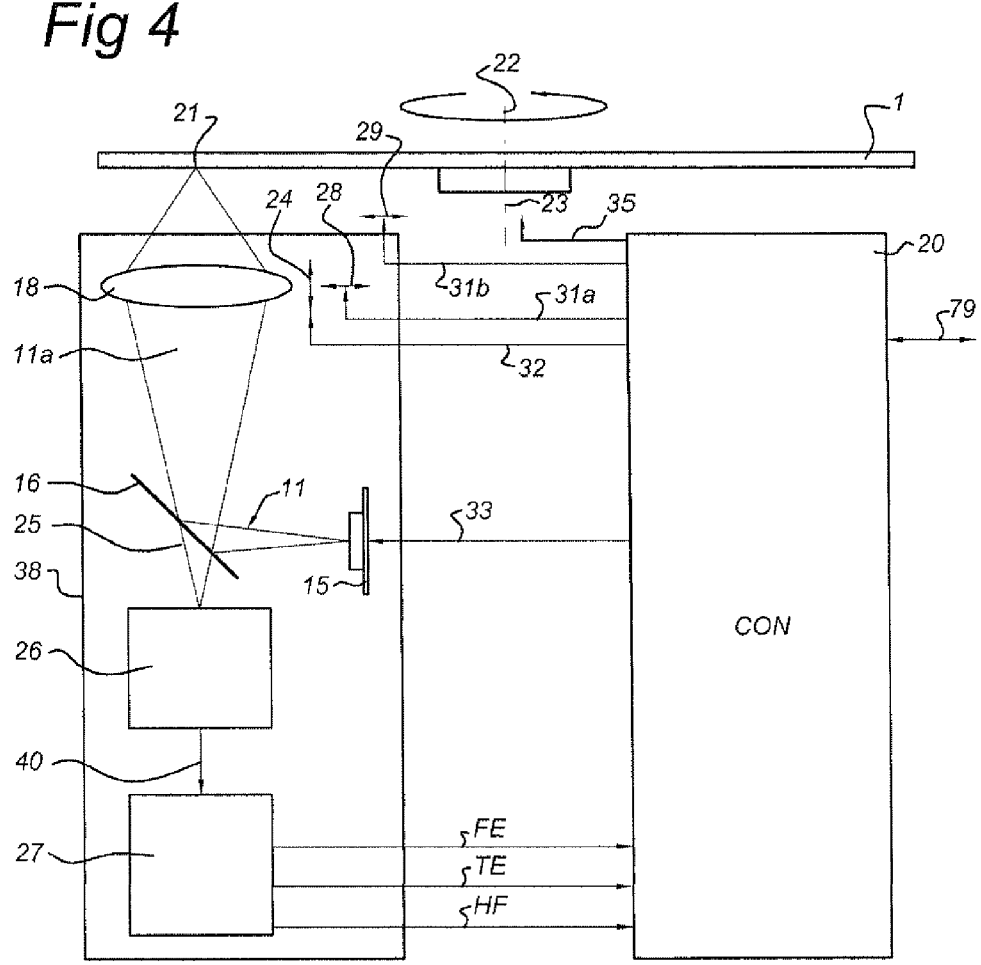
Figure 5:
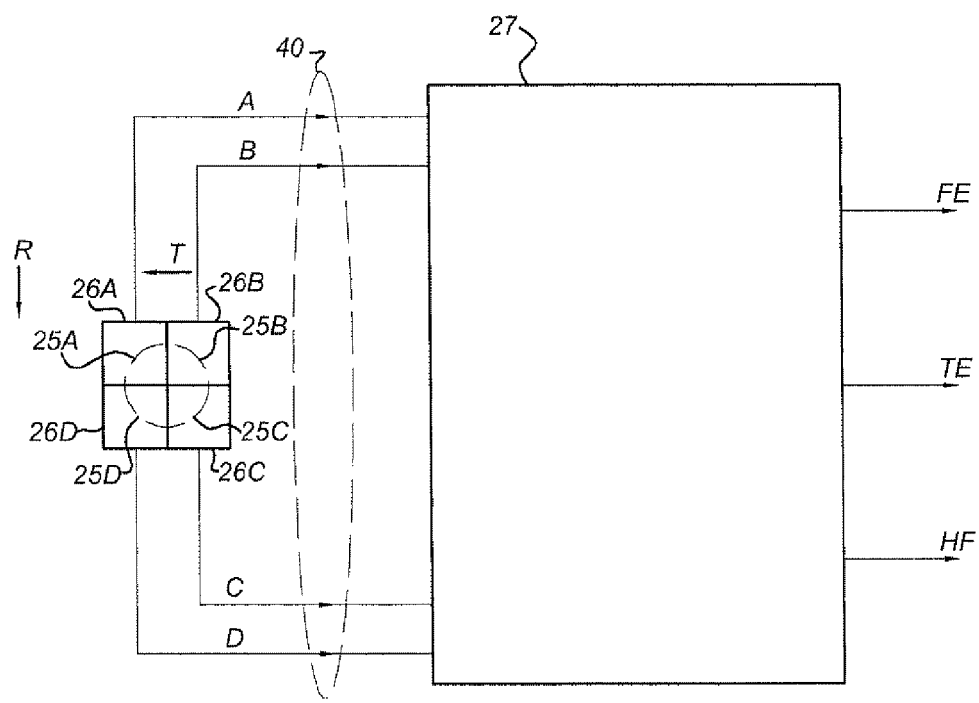
Figure 6:
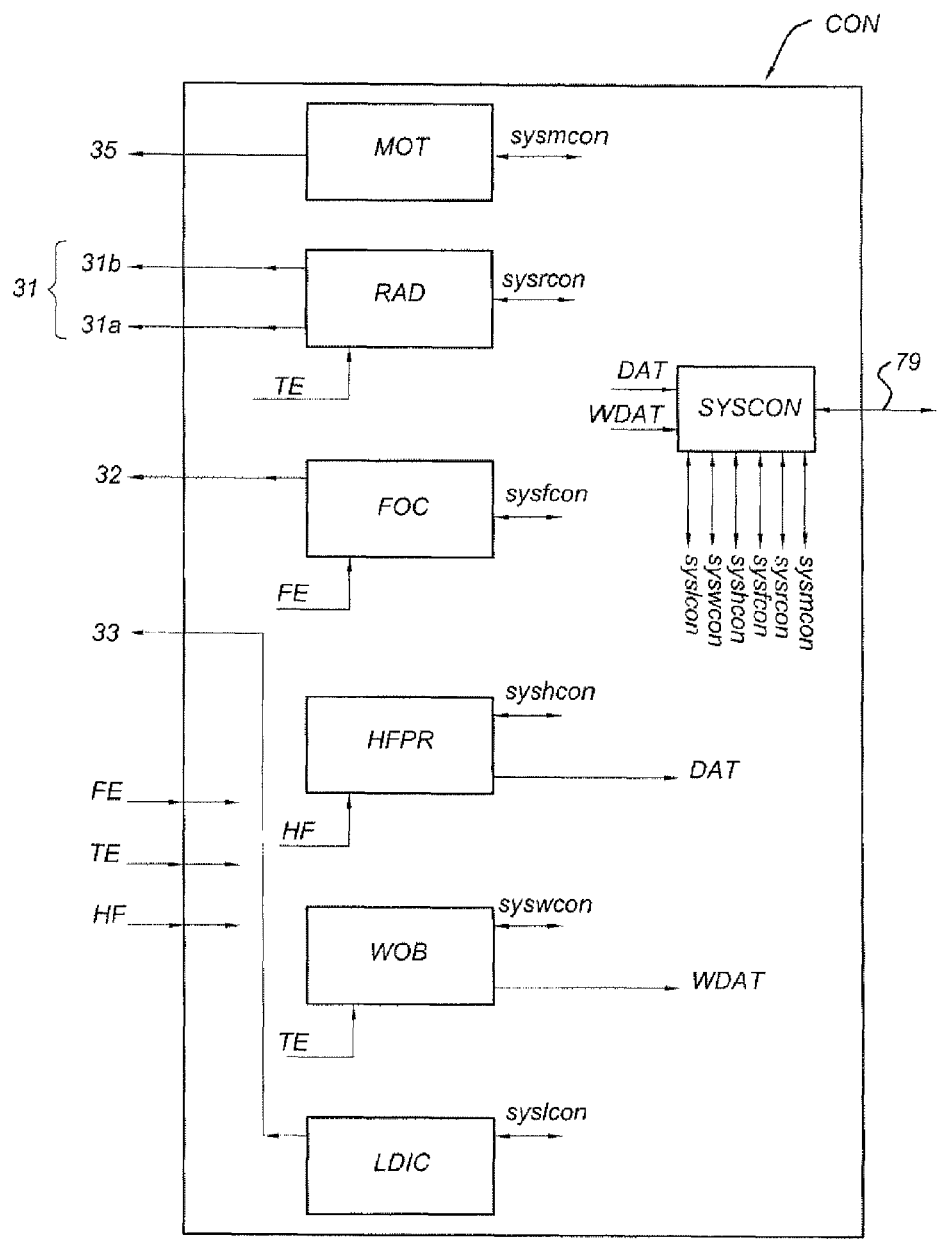
Figure 7:
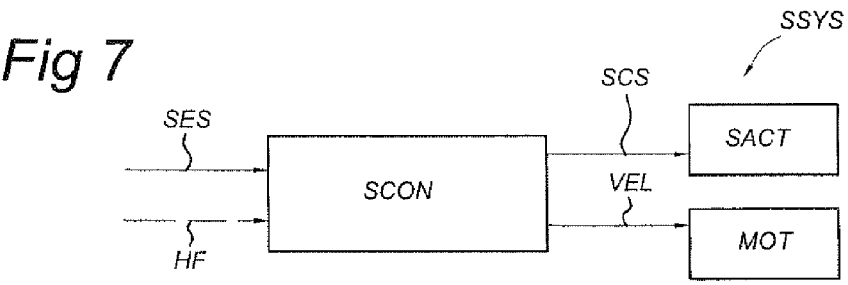
Figure 9:
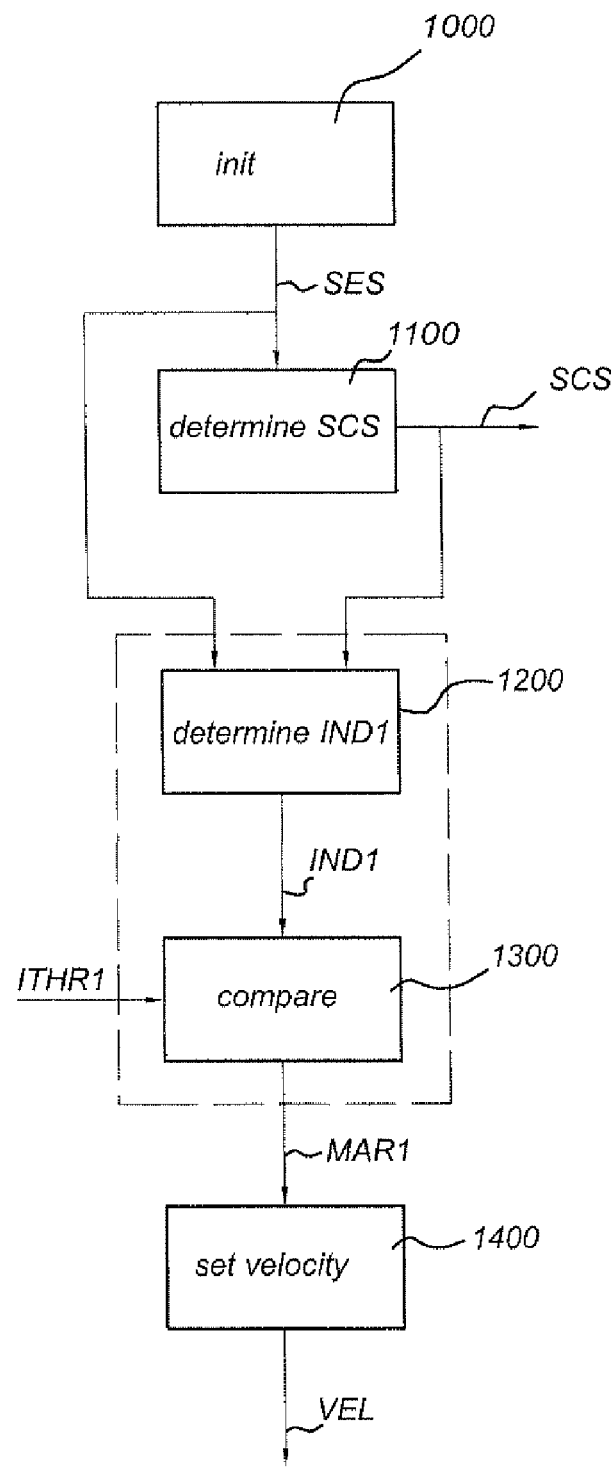
Figure 10:
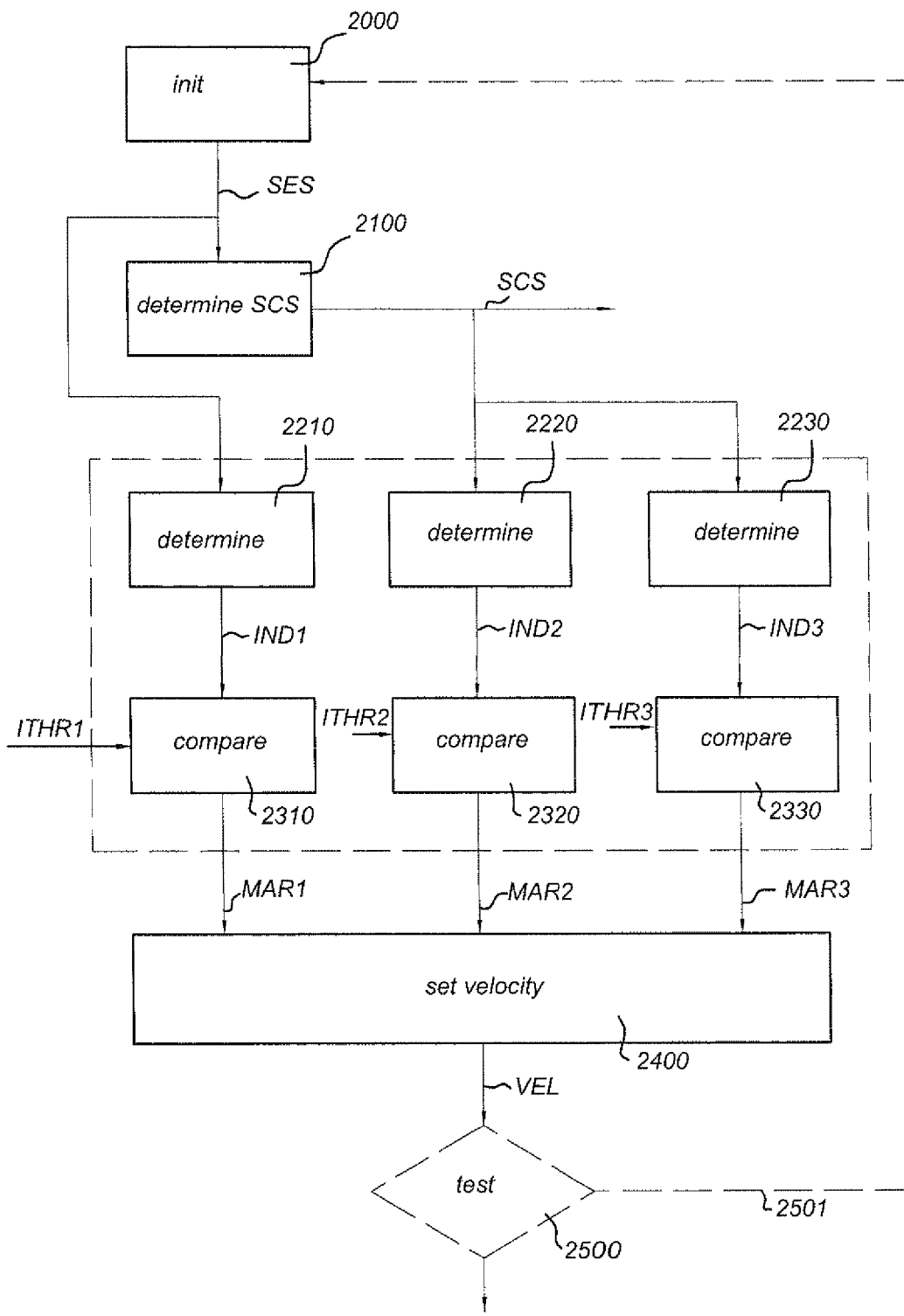
Figure 11:
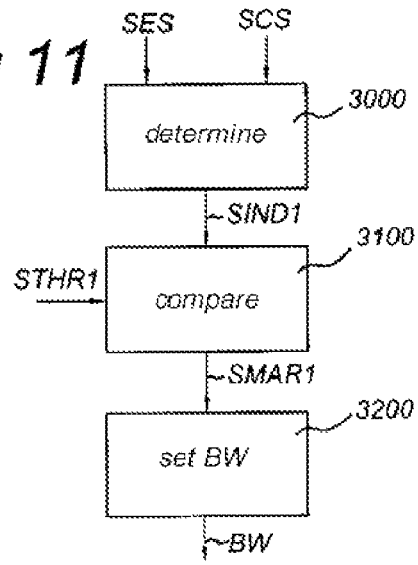
Figure 12:
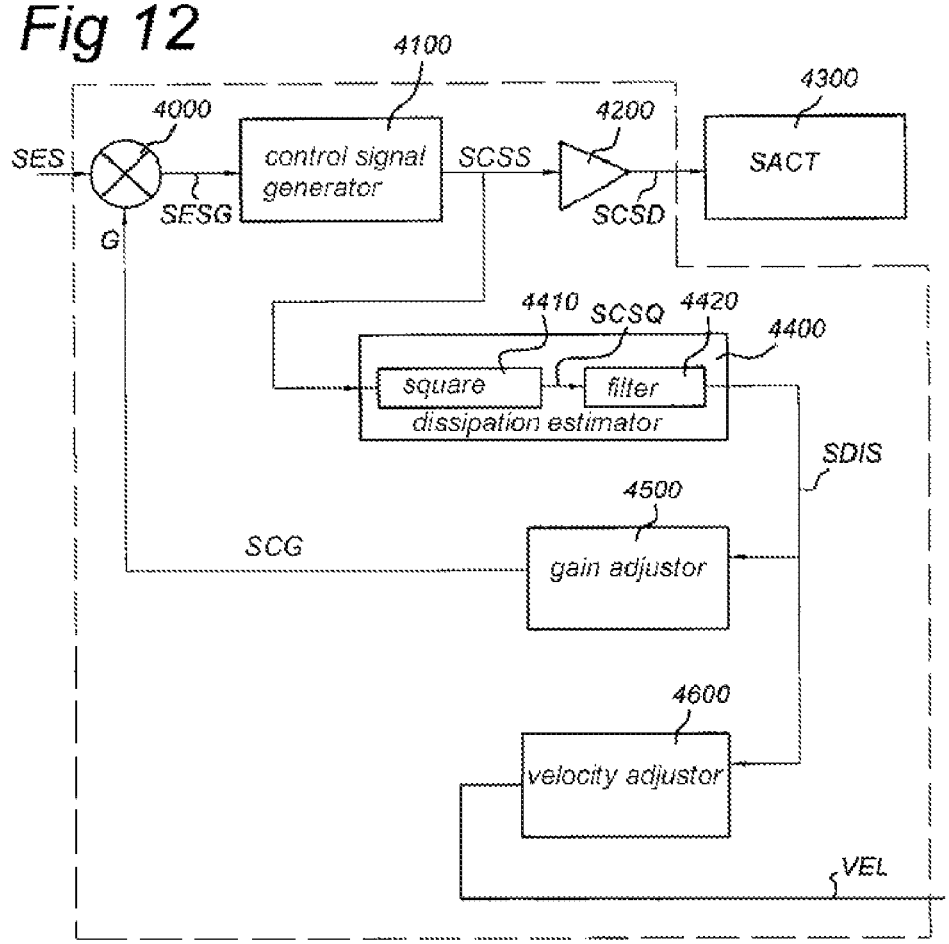
Figure 13A:
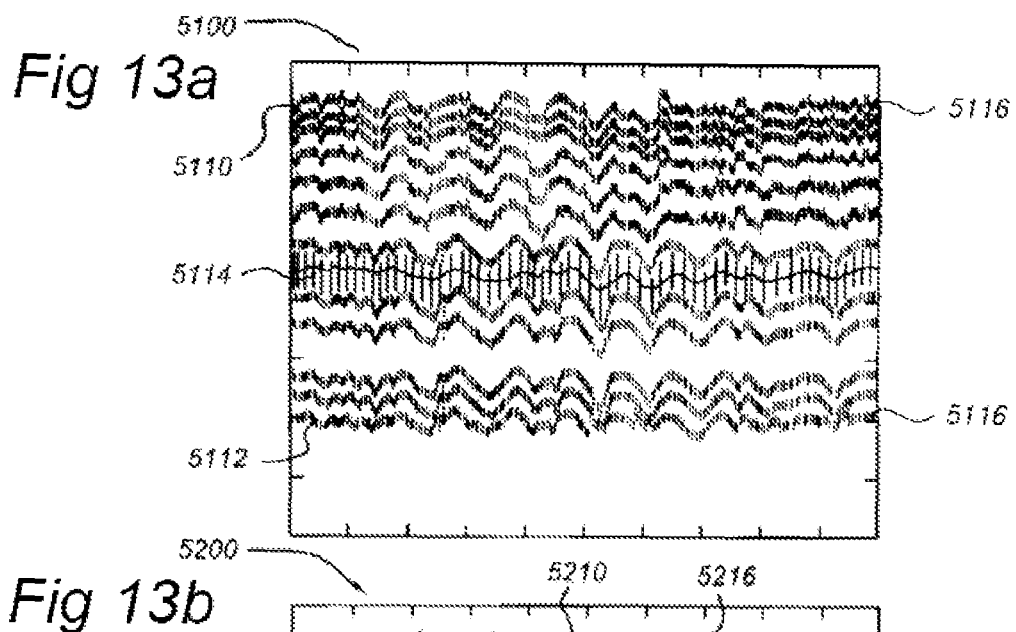
Figure 13B:
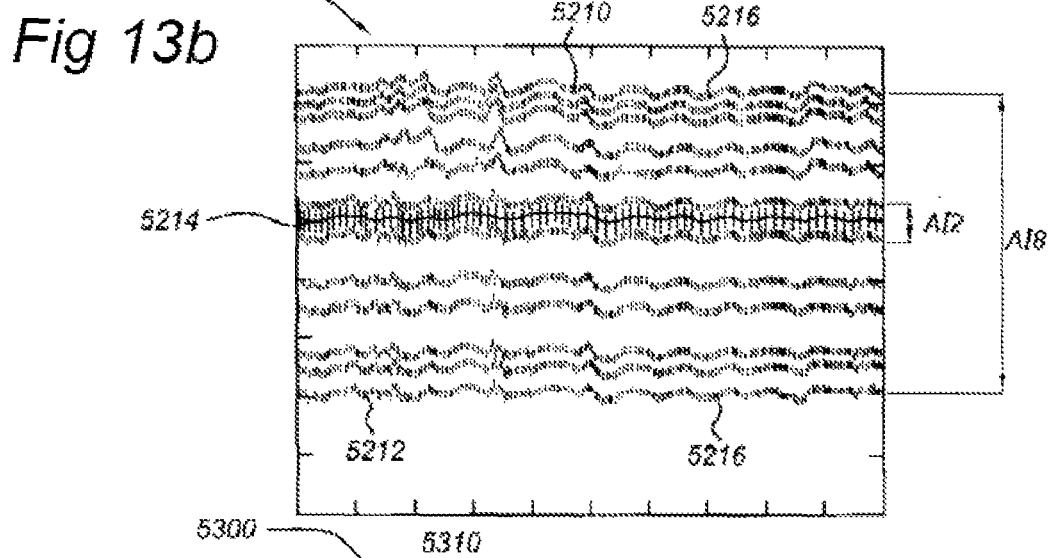
Figure 13C:
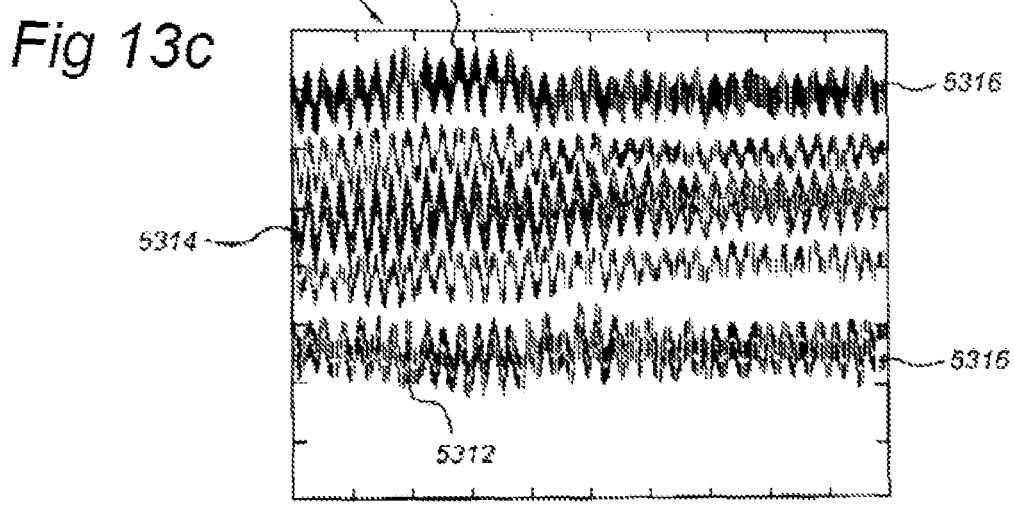
Figure 14:
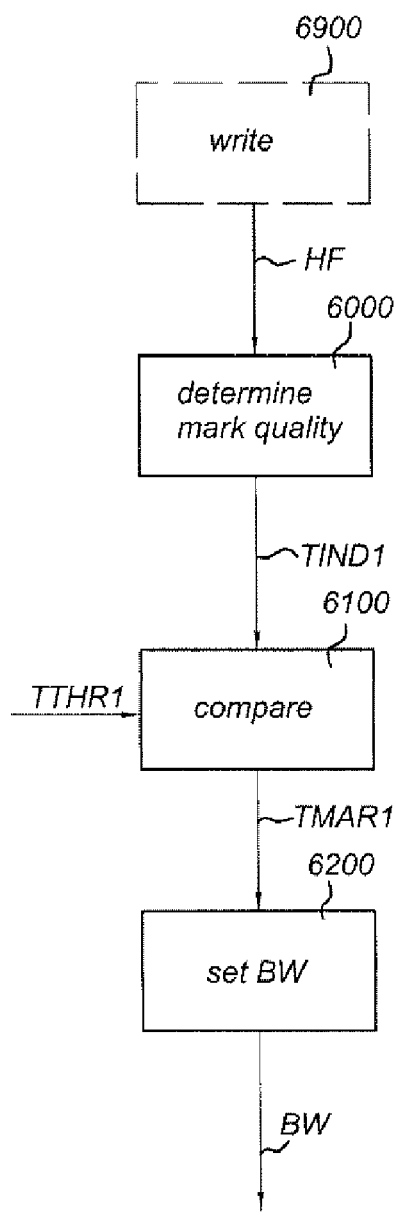
Figure 15:
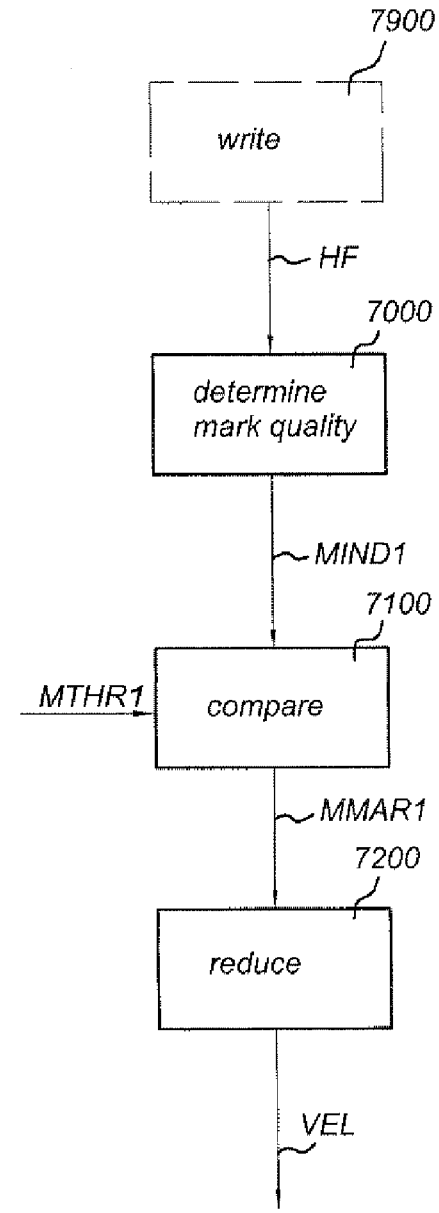
Figure 16:
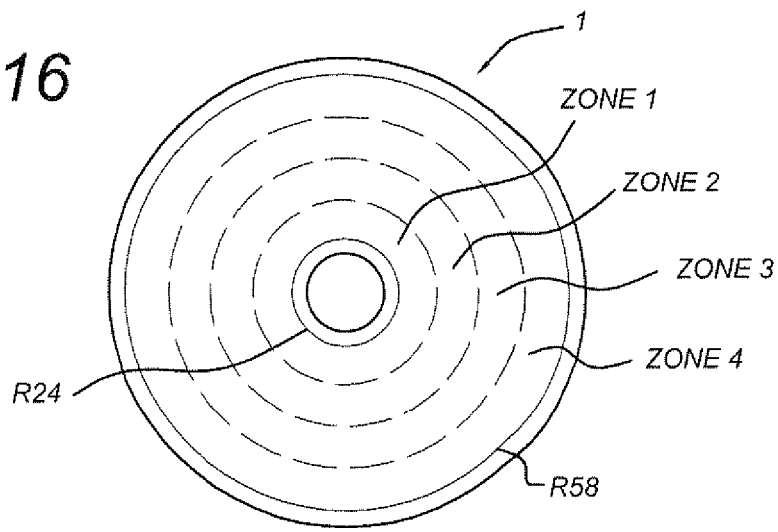
Figure 18:
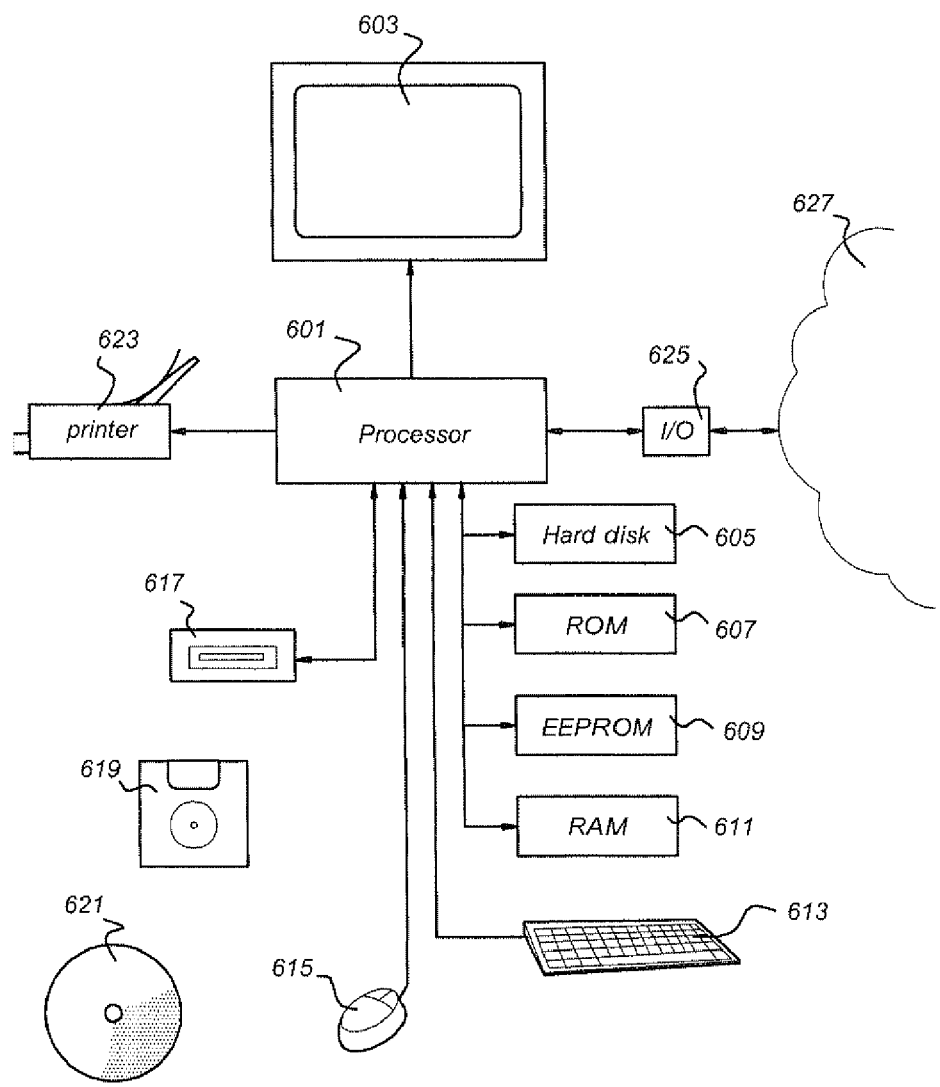

FIG. 2 schematically shows a wobbled groove and recorded information marks in the grooves on an optical disk of one of a recordable or rewritable types;

FIG. 3 schematically shows embossed marks on an optical disk of a read-only type;

FIG. 4 schematically shows an optical disk drive;

FIG. 5 schematically shows a signal processing unit of an optical disk drive;

FIG. 6 schematically shows a controller of an optical disk drive;

FIG. 7 schematically shows an embodiment of a servo system in an optical disk drive according to the invention;

FIG. 8A-FIG. 8G schematically show an example of servo error signals and servo control signals;

FIG. 9 schematically shows an embodiment of a method according to the invention;

FIG. 10 schematically shows another exemplary embodiment of a method according to the invention;

FIG. 11 shows a further exemplary embodiment of a method according to the invention;

FIG. 12 shows an exemplary block diagram of an implementation of a method according to the invention;

FIG. 13A-FIG. 13C show a central aperture signal as a function of time for three focus servo gain conditions;

FIG. 14 shows an exemplary embodiment of elements of a method according to the invention;

FIG. 15 shows another exemplary embodiment of elements of a method according to the invention;

FIG. 16 shows an optical disk comprising a plurality of zones;

FIG. 17a-FIG. 17f show scanning velocity profiles associated with an embodiment of a method according to the invention using a plurality of zones;

FIG. 18 shows an overview of a computer arrangement that can be used to carry out the method according to the invention.

DETAILED DESCRIPTION

Figure 1A:
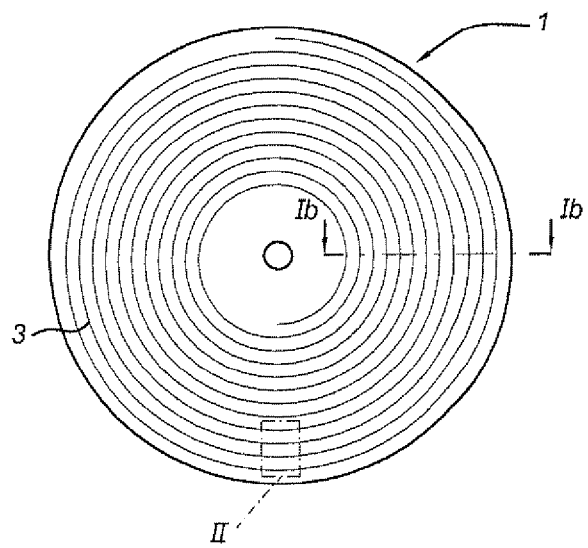
FIG. 1b shows a cross section of an optical disk with one recording layer.
FIG. 1c shows a cross section of an optical disk with two recording layers.
Figure 1B:
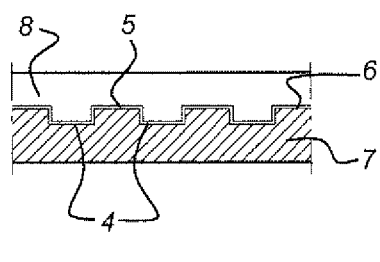
Figure 1C:
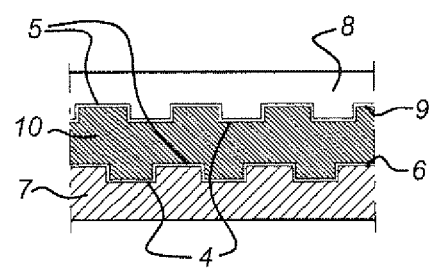

FIG. 1a-c show an optical disk 1 and FIG. 2 shows a detailed view of area II of the optical disk 1. The optical disk has a substantially circular, spiralling track 3. The track 3 is a groove 4 in a surrounding surface area 5, also called land. A recording layer 6 is deposited on the substrate 7. The recording layer is covered with a transparent cover layer 8. In a Blu-Ray disk (BD), the transparent cover layer has a nominal thickness of 0.100 mm, and access of the tracks is done through this transparent cover layer. In a DVD disk or a HD-DVD disk, access is done through the substrate 7, which has a thickness of 0.6 mm. In a CD disk, access is done through the substrate 7, which has a thickness of 1.1-1.2 mm.

A Blu-Ray disk may alternatively comprise a flat substrate 7, with the track 3 being replicated in or on the cover layer 8 and the recording layer 6 being deposited on the cover layer 8. The cover layer 8 can, e.g., be a foil sheet, which is glued to the substrate 7.

The optical disk 1 may have a single recording layer 6 as shown in FIG. 1b. The optical disk 1 may also have multiple recording layers 6, 9, separated by a transparent spacer layer 10 as shown in FIG. 1c. In a Blu-Ray disk with multiple recording layers, the spacer layer 10 usually has a thickness in the range of 0.020 mm-0.030 mm.

The disk is produced as a disk with empty tracks 12, as is shown in FIG. 2. The track can accommodate marks 14 which can be written on the track with an optical disk drive. The marks 14 are separated along the track by spaces. The marks can be erased and overwritten in, e.g., a rewritable Blu-Ray disk (BD-RE disk), but can also be of a permanent nature as in a recordable Blu-Ray disk (BD-R disk). The marks and spaces are of various lengths, and carry data information. These marks and spaces can be read out with an optical disk drive, as scanning along the track over these marks and spaces results in a modulation of light reflected on the disk, which is detected by the optical disk drive with a sensor.

As shown in FIG. 2, the track 3 may have a sinusoidal deviation from its nominal position into the radial direction R of the disk. This sinusoidal deviation is called the wobble. The wobble can be a fixed-frequency continuous sinusoidal for use as a time reference signal, e.g., to which the disk speed or a signal clock can be related, or a modulated sinusoidal encoding wobble data information, e.g., a frequency-modulated sinusoidal with a modulation around a centre frequency encoding or a phase-modulated sinusoidal with a modulation at a fixed frequency. Various standardized optical disk systems use the wobble for carrying information to classify the disk and the values of various parameters, e.g., the address of a specific location on the disk and write strategy parameter values. Disks according to the DVD+RW, BD-RE and BD-R standards have a phase-modulated wobble at a fixed spatial period measured along the track. Disks according to the DVD-RW standard have a frequency-modulated wobble.

The track 3 may also comprise portions where the continuous groove 4 is preceded or interrupted by a series of embossed pits, so-called header marks (not shown). The header marks may carry information to classify the disk and the values of various parameters, alternatively or additionally to the information in the wobble. Alternatively or additionally, the continuous land portion 5 may also be interrupted by embossed pits (not shown), so-called land pre-pits, as, e.g., in disks according to the DVD-R standard. Alternatively or additionally, embossed pits may also be positioned in between the groove 4 and the land portion 5, as, e.g., in disks according toe the DVD-RAM standard.

FIG. 3 schematically shows embossed marks on an optical disk of a read-only type.

The read-only disk is produced as a disk with a spiralling track 3, of which subsequent turns may be referred to as grooves 120, 130. The spiralling track is formed by a series of marks 140. The marks 140 are separated along the track by spaces 142. The grooves 120, 130 are separated by an area referred to as land. As the land has the same physical level on the substrate 7 as the spaces 142, it is general phrasing to also refer to the spaces 142 in between the marks 140 as land. The marks 140 may be pits in the substrate or elevations on the substrate, and are generally referred to as embossed pits for either situation. The surface of the substrate 6 carrying the pits may be referred to as the information layer.

FIG. 4 shows an optical disk drive. The optical disk 1 rotates about an axis 22 operated by a motor 23. An optical source 15, here shown as a laser diode 15, generates an incident optical beam 11, which is directed onto the optical disk via a beam splitter 16, and an objective lens 18. The beam splitter 16 steers the beam over a 90 degree angle. The incident beam 11a, is focused by the objective lens 18 into a focussing spot 21 on the track 3. The disk is rotated about the axis 22 by a motor 23 for the spot 21 to scan the tracks along the track. A focus actuator 24 can move the objective lens 18 parallel to its optical axis, i.e., in a direction perpendicular to the disk surface away to or towards the optical disk, to change the depth of the position of the focussing spot 21. A tracking actuator 28 can move the objective lens 18 in the radial direction of the optical disk, to rapidly follow radial excursions of the track when the track 3 is somewhat eccentric to the axis 22. The optical disk drive may further comprise a spherical aberration correction actuator (not shown), capable of applying a correction to the incident beam to compensate for a difference in spherical aberration originating from a substrate thickness (or for BD, cover layer thickness) being different from its nominal value. Likewise, a difference in spherical aberration originating from a spacer layer can also be compensated for when focussing on the different layers of a multi-layer disk. The entire optical system is fitted onto a single support so as to constitute an integrally moveable optical head 38. The movement of the optical head is performed by a head motor 29. A control unit 20 controls the actuators 24, 28 and 29 to keep the optimal position for the objective lens while the disk is rotating. The optical disk reflects the incident beam. The reflected beam 25 is separated from the incident beam by the beam splitter 16. An astigmatic lens (not drawn) may be positioned in the reflected beam to shape the reflected beam 25. The reflected beam is detected by a sensor 26 generating a sensor signal 40. The sensor signal 40 is passed to a pre-processing circuit 27.

As is shown in detail in FIG. 5, the sensor may be a quadruple photodetector 26, having four sensor segments 26A-26D for sensing the intensities of four portions of the reflected beam 25. The sensor signal comprises four channels, A-D, one for each sensor segment, which are provided to a pre-processing unit 27. The arrow R represents the relation between the beam portions and the radial direction of the optical disk 1 and the arrow T represents the relation between the beam portions and the tangential direction of the optical disk 1. I.e., sensor 26A and 26B detect intensities corresponding to the inner upper and inner lower quarters respectively of spot 21 as reflected by the optical disk 1, and sensor 26C and 26D detect intensities corresponding to the outer lower and outer upper quarters respectively of spot 21 as reflected by the optical disk 1. The pre-processing unit 27 processes the intensity signals A-D generated by the sensor segments 26A-26D so as to produce a focus error signal FE, a tracking error signal TE and a central aperture signal HF. The central aperture signal HF is produced as the sum of all the intensity signals. When using an astigmatic focussing method, the focus error signal FE is derived as FE=(A+C)−(B+D). The tracking error signal TE may be a radial push-pull signal PP, derived from the intensity signals as PP=(A+B)−(C+D). The central aperture signal may also be referred to as the data signal. The error signal may be of this form, but may also be normalized, with a normalized radial push-pull signal NPP=((A+B)−(C+D))/(A+B+C+D) and a normalized focus error signal NFE=((A−B)/(A+B))+((C−D)/(C+D)). Another focussing method may alternatively be used, such as the spot-size method or the Foucault method, with a corresponding focus error signal FE. The tracking error signal TE may alternatively be e.g. a so-called Differential Phase Detection signal DPD, e.g. for radial tracking on a ROM disk when the information layer has embossed marks 140, e.g. with DVD-ROM disks. The Differential Phase Detection signal may be produced from a phase difference between the sum signal of signal A and C and the sum signal of signal B and D. This phase difference may be expressed as DPD=phase(A+C)−phase(B+D).

FIG. 6 shows a control unit CON of the optical disk drive. The control unit CON may include one or several microprocessors or digital signal processors. The control unit CON is responsible for several control tasks. The tasks can be executed in the control unit itself, or in an external processor cooperating with the control unit.

The tracking error signal TE is passed to a radial tracking controller RAD. Arrows 31a and 31b denote the capability of the radial tracking controller RAD to control the tracking actuator 28 and the head motor 29, so as to drive the radial position of the objective lens 18 and the optical head 38. For this purpose, the tracking controller RAD controls the tracking actuator 28 such that the tracking error signal TE substantially has a predetermined value, also called tracking offset. This tracking offset is usually zero. The tracking controller RAD may also be equipped to measure a quality of the radial error signal. Measures used commonly in the art include a push-pull signal amplitude, a DPD signal amplitude and a wobble signal amplitude. The radial tracking controller RAD and the tracking actuator 28 may be further referred to as a radial servo system.

The focus error signal FE (or NFE) is passed to a focus controller FOC. Arrow 32 represents the capability of the focus controller FOC to control the focus actuator 24, so as to keep the focussing spot 21 focussed at the correct depth in the track 3. For this purpose, the focus controller FOC controls the focus actuator 24 such that the focus error signal has a predetermined value, also called focus offset. The focus controller and the focus actuator 24 may be further referred to as a focus servo system.

The data signal HF may be passed to a data recovery mechanism HFPR. The data recovery mechanism HFPR retrieves the data as recorded with the marks 14 and spaces 15 on the recordable optical disk 1, or as present as embossed pits 140 and spaces 150 on a ROM disk. The processing of the data signal HF and the further processing of the recovered data will not be further described here.

Arrow 33 denotes the capability of a laser driver controller LDIC to control the laser diode 15, for example to control the intensity of the incident beam 11. The LDIC may be physically located inside the controller CON, but may alternatively be located on the optical head 38 close to the laser diode 15.

Arrow 35 denotes the capability of a disk motor controller MOT to control the motor 23. A speed of the motor 23 may be adjusted, e.g., to scan the optical disk 1 with a well-defined linear speed or a well-defined angular speed.

Optionally, the tracking error signal TE is also passed to a wobble processor WOB, in particular when the tracking error signal TE is a radial push-pull signal PP. When scanning the track, the amplitude radial push-pull signal PP shows a variation as a function of time as a result of the wobble on the disk. This variation is also commonly referred to as the wobble signal WS. The wobble processor WOB may generate a digital wobble data signal WDAT from the wobble signal WS. The digital wobble data signal WDAT may further be processed by a digital processor SYSCON, in order to retrieve so-called wobble data coded in the wobble. The wobble data may, e.g., comprise the physical address of the location on the disk, standard write strategy information such as laser power and timing parameters for writing marks, disk information such as the disk manufacturer. The use of the wobble data will not be further described here. The wobble processor WOB may also retrieve a frequency corresponding to the spatial frequency of the wobble on the disk 1 from the wobble signal WS. The wobble processor WOB may also be equipped to measure a quality of the wobble signal WS. Measures used commonly in the art include wobble amplitude, wobble signal-to-noise ratio (wSNR), wobble error rate.

The digital processor SYSCON may also provide and monitor information, such as control settings, via control lines SYSHCON, SYSRCON, SYSFCON, SYSLCON, SYSWCON, SYSMCON to and from the data recovery mechanism HFPR, the radial tracking controller RAD, the focus controller FOC, the laser driver controller LDIC, the wobble processor WOB and the disk motor controller MOT. The focus controller FOC may, e.g., receive a focus offset value via control line SYSFCON in order to apply a focus offset to the focus actuator and hence to move the objective lens towards or away from the disk. The digital processor SYSCON may also interface via 79 to external components, e.g., a host computer in which the optical disk drive is mounted.

The control unit CON may be arranged for aiming to scan the track 3 on the optical disk 1 with an optimal quality of the spot 21. For this purpose, the digital processor SYSCON can, e.g., retrieve a measurement value of push-pull signal amplitude from the radial tracking controller RAD, a measurement value of jitter from the data recovery mechanism HFPR, and a measurement value of wobble amplitude from the wobble processor WOB. By comparing a selection of these measurement values as a function of one or more operating parameters of the various controllers, the digital processor SYSCON may generate optimal values for the operating parameters.

The control unit CON may also comprise a memory unit (not drawn) or cooperate with an external memory device (not drawn), to store and retrieve e.g. control settings, measurement values, values for the operating parameters, one or more tables comprising information related to disk classes, disk types, disk information, write strategies, etc.

FIG. 7 schematically shows an embodiment of a servo system SSYS in an optical disk drive according to the invention. The servo system SSYS comprises a servo controller SCON arranged to receive a servo error signal SES and to provide a servo control signal SCS to a servo actuator SACT. The servo controller SCON may further receive a central aperture signal HF. The servo controller SCON provides a scanning velocity signal VEL to the disk motor controller MOT with its appropriate settings for controlling the disk motor 23 with motor control signal 35.

The servo system SSYS may be the focus servo system described above in reference to FIG. 6, with the servo controller SCON being the focus controller FOC and the servo actuator SACT being the focus actuator 24, the focus controller FOC using the focus error signal FE as the servo error signal SES and providing the focus control signal 32 as the servo control signal SCS.

The servo system may be the radial servo system described above in reference to FIG. 6, with the servo controller SCON being the radial tracking controller RAD and the servo actuator SACT being the tracking actuator 28, the radial tracking controller RAD using the tracking error signal TE as the servo error signal SES and providing the tracking control signal 31a as the servo control signal SCS.

In the exemplary description below, the radial servo system will be used.

FIG. 8A-FIG. 8G schematically show examples of servo error signals and servo control signals. The examples show tracking error signal TE and tracking control signal 31a as a function of time for various situations. The example uses a radial push-pull signal from a recordable disk as the tracking error signal TE.

Figure 8A:
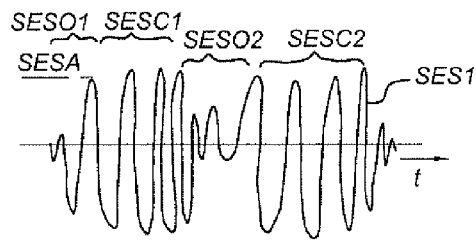

FIG. 8A shows an open-loop radial push-pull signal SES1 while the spot is focused on the optical disk in a closed-loop focus servo condition and an open-loop radial servo condition, while the spot 21 is moved with a scanning speed in approximately the tangential direction T along the optical disk 1. The open-loop radial push-pull signal SES1 is shown for a period corresponding to approximately one revolution of the optical disk 1. The open-loop radial push-pull signal SES1 shows an sinusoidal shaped waveform with a first amplitude SESA that is substantially constant during the major fraction of the revolution SESC1, SESC2, and a small amplitude during a small fraction of the revolution SESO1, SESO2. The sinusoidal waveform corresponds to a crossing of the spot 21 in the radial direction R over a plurality of subsequent turns of the spiraling track 3. The two small fractions of the revolution SESO1, SESO2 correspond to the so-called turning points and correspond to moments in time where the track on the optical disk has a maximum radial excursion and a minimum radial excursion, i.e. where the radial velocity of the track on the optical disk is smallest. The number of oscillations between the turning points correspond approximately to eccentricity of the track and expresses the eccentricity in number of tracks (i.e. the number of turns of the spiral). In an embodiment of the method according to the invention, these number of oscillations between the turning points is measured and used as an indicator associated with the eccentricity of the track, and thus as a performance indicator of the radial servo actuator. In particular, it may be used to estimate a maximum amplitude of the control signal required for driving the radial servo actuator such that the position of the spot remains on the track with a sufficiently small deviation, or another indicator associated with the sensitivity of the actuator. E.g., when the estimated maximum amplitude would be larger than a pre-determined margin, the pre-determined margin denoting a maximum allowable amplitude at the scanning speed, the scanning speed may be reduced.

Figure 8B:
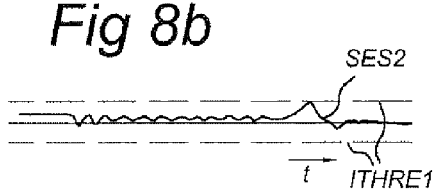
Figure 8D:
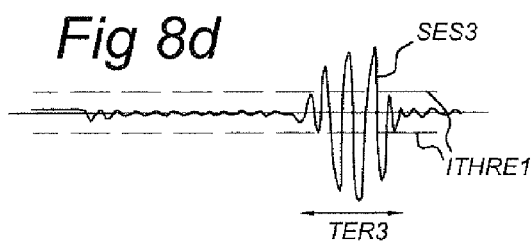
Figure 8F:
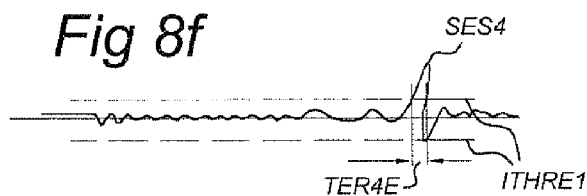
Figure 8C:
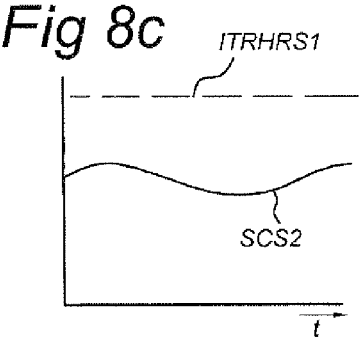
Figure 8E:
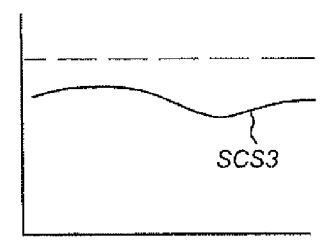
Figure 8G:
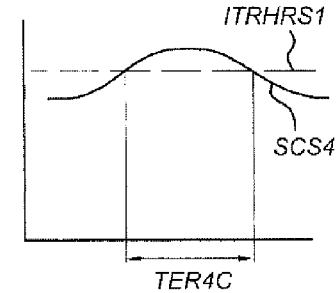

FIG. 8B, FIG. 8D and FIG. 8F show a closed-loop radial push-pull signal SES2 while the spot is focused on the optical disk in a closed-loop focus servo condition and a closed-loop radial servo condition, while the spot 21 is moved with a scanning speed along the track 3 of the optical disk 1 and the radial servo actuator 28 is controlled with the radial servo control signal 31a in dependence on the radial error signal SES2. FIG. 8B, FIG. 8D and FIG. 8F further show a tracking error threshold ITHRE1. FIG. 8C shows the servo control signal SCS2 corresponding to FIG. 8B, and a servo control signal threshold ITHRS1. FIG. 8E shows the servo control signal SCS3 corresponding to FIG. 8D. FIG. 8G shows the servo control signal SCS4 corresponding to FIG. 8F.

FIG. 8B and FIG. 8C relate to a situation where tracking is performed with sufficient margin on both the tracking error signal SES2 as on the tracking control signal SCS2, both remaining below the corresponding thresholds ITHRE1 and ITHRS1.

FIG. 8D and FIG. 8E relate to a situation where tracking is performed with sufficient margin on the tracking control signal SCS3, remaining below the threshold ITHRS1, but with insufficient margin on the tracking error signal SES3, as the amplitude of the tracking error signal exceeds ITHRE1 during a time period TER3.

FIG. 8F and FIG. 8G relate to a situation where tracking is performed without sufficient margin on both the tracking error signal SES4 as on the tracking control signal SCS4, both exceeding their corresponding thresholds ITHRE1 and ITHRS1 during respective time periods TER4E and TER4C.

FIG. 9 schematically shows an exemplary embodiment of a method according to the invention, The method may be implemented in control unit CON shown in FIG. 4 and FIG. 6, or in another controller cooperating with the control unit CON via e.g. the interface 79.

The method starts with an initialization 1000. In this example, the initialization comprises setting the scanning velocity VEL to a target velocity using the disk motor controller MOT and focusing the spot on the optical disk with the focus servo system FOC, 24. Initialization 1000 delivers a servo error signal SES by, in this example tracking error signal TE.

A servo control signal SCS is determined in dependence on the servo error signal SES in block 1100. In this example, the servo control signal SCS is the tracking control signal 31a. The servo actuator SACT, being in this example the tracking actuator 28, is controlled with the servo control signal SCS. The servo control signal SCS is determined to obtain a sufficiently small servo error signal SES, such that the spot 21 remains sufficiently well on the track 3.

In block 1200, a first performance indicator IND1 is determined from the servo error signal SES. In this example, the first performance indicator IND1 is determined as the maximum amplitude of the servo error signal SES in closed-loop radial tracking, also referred to as the maximum residual error. The maximum residual error is associated with a bandwidth of the servo system SSYS, which may be limited by a mechanical bandwidth of the actuator SACT. The first performance indicator IND1 may alternatively be an alternative measure associated with the bandwidth of the servo system SSYS or be another alternative measure associated of the mechanical bandwidth of the actuator SACT. The first performance indicator IND1 may alternatively be associated with a dissipation of the servo actuator SACT, e.g. determined from measuring a power of the servo actuator SACT, or a power-related measure such as a root-mean-square average of the servo control signal SCS controlling the servo actuator SACT. The first performance indicator IND1 may alternatively be associated with a sensitivity of the servo actuator SACT, e.g. determined from measuring a peak amplitude of the servo control signal SCS.

In 1300, the first performance indicator IND1, i.e. in this example the amplitude of the servo error signal SES, is compared against threshold ITHR1 for determining a servo margin MAR1. The servo margin MAR1 is determined from the difference between the first performance indicator IND and the threshold ITHR1. When the first performance indicator IND1 is associated with the dissipation of the servo actuator SACT, the first servo margin MAR1 may express the margin relative to a maximum allowable dissipation. When the first performance indicator IND1 is associated with the sensitivity of the servo actuator SACT, the first servo margin MAR1 may express the margin relative to an available sensitivity of the servo actuator SACT, related with an available acceleration of the servo actuator SACT.

Block 1400 receives the servo margin MAR1 and sets the scanning velocity VEL. When the servo margin MAR1 is sufficiently large, the scanning velocity VEL is maintained at its current value, i.e. at the target velocity. When the servo margin MAR1 is insufficient, the scanning velocity VEL is reduced in dependence on the value of the servo margin MAR1.

Hence, when determining the scanning velocity VEL just from the servo error signal SES, in the situation associated with FIG. 8B, the scanning velocity VEL is maintained at the target velocity. In the situations associated with FIG. 8D and FIG. 8F, the scanning velocity VEL is reduced.

The first performance indicator IND1 may alternatively be determined from the servo control signal SCS. The first performance indicator IND1 may then e.g. be determined as the maximum amplitude of the servo control signal SCS. Alternatively, the first performance indicator IND1 may e.g. be determined as the power of the servo control signal SCS, or as a corresponding measure such as the root-mean-square (RMS) of the servo control signal SCS.

Hence, when determining the scanning velocity just from the servo error signal SES, in the situations associated with FIG. 8B and FIG. 8D, the scanning velocity VEL is maintained at the target velocity. In the situation associated with FIG. 8F, the scanning velocity is reduced.

FIG. 10 schematically shows another exemplary embodiment of a method according to the invention. The method may be implemented in control unit CON or in another controller cooperating with the control unit CON The method starts with an initialization 2000 as in block 1000 in FIG. 9.

A servo control signal SCS is determined in dependence on the servo error signal SES in 2100, as in block 1100 in FIG. 9.

In block 2210, a first performance indicator IND1 is determined from the servo error signal SES. In this example, the first performance indicator IND1 is determined as the maximum amplitude of the servo error signal SES, as in FIG. 9.

In block 2220, a further first performance indicator IND2 is determined from the servo control signal SCS. In this example, the further first performance indicator IND2 is determined as the peak amplitude of the servo control signal SCS.

In block 2230, a still further first performance indicator IND3 is determined from the servo control signal SCS. In this example, the still further first performance indicator IND3 is determined as the power of the servo control signal SCS.

In 2310, the first performance indicator IND1 is compared against threshold ITHR1 for determining servo margin MAR1, as in 1300 in FIG. 9. The threshold ITHR1 corresponds to a maximum allowable residual track error signal, associated with a maximum residual detracking. The servo margin MAR1 is determined from the difference between the indicator and the threshold ITHR1. Exceeding the maximum allowable residual track error signal is associated with an insufficient bandwidth of the radial servo actuator SACT.

In 2320, the further first performance indicator IND2 is compared against threshold ITHR2 for determining servo margin MAR2. The threshold ITHR2 corresponds to a maximum allowable amplitude of the servo control signal SCS, associated with a sensitivity of the radial servo actuator SACT.

In 2330, the still further first performance indicator IND3 is compared against threshold ITHR3 for determining servo margin MAR3. The threshold ITHR3 corresponds to a maximum allowable power of the servo control signal SCS, associated with a dissipation of the radial servo actuator SACT.

Block 2400 receives the servo margins MAR1, MAR2 and MAR3 and sets the scanning velocity VEL. When all servo margins MAR1, MAR2, MAR3 are sufficiently large, the scanning velocity VEL is maintained at its current value, i.e. at the target velocity. When at least one of the servo margins MAR1, MAR2 and MAR3 is insufficient, the scanning velocity VEL is reduced in dependence on at least the values of the servo margins MAR1, MAR2 and MAR3. Using a plurality of first performance indicators IND1, IND2, IND3 with a plurality of associated servo margins MAR1, MAR2 and MAR3 allows to be robust against a wide variety of combinations of optical disks 1 and optical disk drives with servo actuators SACT. E.g., a first optical disk in a specific optical disk drive may perform well in relation with the achievable bandwidth of the servo actuator SACT as determined from the first servo margin MAR1 associated with the first performance indicators IND1 while performing relatively poor in relation with the dissipation of the servo actuator SACT as determined from the third servo margin MAR3 associated with the third performance indicators IND3, causing the scanning velocity VEL to be reduced for achieving an acceptable dissipation at a reduced scanning velocity, whereas a second optical disk in the optical disk drive may perform well on all margins MAR1, MAR2, MAR3, and a third optical disk may fail on the first servo margin MAR1, causing the scanning velocity VEL to be reduced for achieving an acceptable residual tracking error using a reduced scanning velocity suitable for the third optical disk with the servo actuator of this specific optical disk drive. Another optical disk drive, possibly even one manufactured in the same optical disk drive production facility, will have a slightly different performance of the servo actuator SACT, and may e.g. allow the first and second optical disk to be scanned at the target velocity, whereas requiring a scanning velocity VEL that is reduced even stronger for the third optical disk.

Determining the scanning velocity VEL is thus performed based on monitoring the servo error signal SES and the servo control signal SCS.

Thus, in the situation associated with FIG. 8B, the scanning velocity VEL is maintained at the target velocity. In the situation associated with FIG. 8D, the scanning velocity VEL is reduced as the servo error signal SES has insufficient margin. In the situation associated with FIG. 8F, the scanning velocity VEL is reduced as the servo error signal SES and the servo control signal SCS have insufficient margin.

In embodiments of the method, after setting the scanning velocity VEL in 2400, a test 2500 is performed whether the method has converged or needs to be iterated at the newly set scanning velocity VEL. If the method needs to be iterated, the methods starts again with initializing 2000 as indicated with the dashed arrow 2501, now at the newly set scanning velocity. The test may e.g. comprise testing whether the scanning velocity VEL has been changed, and decide for an iteration if the scanning velocity VEL has changed more than a pre-determined change threshold. The iteration may use the same set of first performance indicators IND1, IND2, IND3 or an alternative set of indicators.

In embodiments of the method, the method is repeated at pre-determined time intervals. The monitoring may thus be performed e.g. substantially continuously. Alternatively, the method is repeated at a plurality of positions along the optical disk 1. An exemplary embodiment of such method will be described below with reference to FIG. 16.

Reducing the scanning velocity VEL may be performed in dependence on further parameters, e.g. further margins derived from further indicators derived for the radial servo system RAD, 28, from further indicators derived from the focus servo system FOC, 24, or from other indicators derived e.g. from a mark quality measurement performed on marks on the optical disk 1.

FIG. 11 shows a further exemplary embodiment of a method according to the invention.

In this example, after the scanning velocity VEL has been set in accordance with e.g. FIG. 9 or FIG. 10, the method proceeds with determining 3000 a second performance indicator SIND1 from at least one of the servo error signal SES and the servo control signal SCS. The second performance indicator SIND1 may be one of the first performance indicators IND1, IND2, IND3 already determined in block 1200, 2210, 2220 or 2230, or a new performance indicator.

E.g., the first performance indicator IND1 may be maximum residual error of the servo error signal SES and the second performance indicator SIND1 may be the power of the servo control signal SCS.

The second performance indicator SIND1 is compared against a second threshold STHR1 for determining a second servo margin SMAR1 in block 3100.

Block 3200 then sets a bandwidth BW of the control of the servo actuator SACT in dependence on the second servo margin SMAR1, e.g. by setting a gain of the control of the servo actuator SACT.

E.g., when the second servo margin SMAR1 indicates that there is still margin in the power dissipated by the servo actuator SACT allowing to increase the bandwidth at the scanning velocity VEL, the bandwidth may be increased up to a value where the power dissipation is just acceptable. This may further improve tracking performance.

E.g., when the second servo margin SMAR1 indicates that there is still margin in the amplitude of the servo control signal SCS, e.g. as the optical disk 1 has a low eccentricity, allowing to decrease the bandwidth at the scanning velocity VEL, the bandwidth is decreased. This may have a negligible effect on the tracking performance, while reducing the power dissipation.

When the second performance indicator SIND1 and the first performance indicators IND1 are the same performance indicators, determining bandwidth of the control may further depend on the corresponding first servo margin MAR1.

Determining the second performance indicator SIND1 and setting the bandwidth may alternatively be performed in parallel with determining the first performance indicator IND1 and setting the scanning velocity VEL.

FIG. 12 shows an exemplary block diagram of an implementation of the method described of FIG. 11.

The servo error signal SES is received by a gain cell 4000. The gain cell 4000 receives a gain signal SCG for applying a gain G to the servo error signal SES to obtain a gained servo error signal SESG. The gained servo error signal SESG is received by a servo control signal generator 4100 for determining a small-signal servo control signal SCSS. The small-signal servo control signal SCSS is amplified by a power amplifier 4200 into a servo control driver signal SCSD for driving the servo actuator SACT 4300.

The small-signal servo control signal SCSS is received by a dissipation estimator 4400. The dissipation estimator 4400 takes the square of the small-signal servo control signal SCSS in squaring unit 4410 for obtained a squared signal SCSQ and filters the squared signal in filter unit 4420 for obtaining a dissipation signal SDIS.

A gain adjuster 4500 receives the dissipation signal SDIS, produces the gain signal SCG based on dissipation signal SDIS and provides the gain signal SCG to the gain cell 4000 thus obtaining a feed-back control of the gain G.

A velocity adjuster 4600 also receives the dissipation signal SDIS and sets the scanning velocity VEL.

FIG. 13A-FIG. 13C show a central aperture signal HF as a function of time for three focus servo gain conditions.

FIG. 13A shows a first central aperture signal 5100 as a function of time for a relatively low bandwidth and gain of the focus servo system FOC, 24 when reading a part of the optical disk 1 on which data is present. FIG. 13A also shows a top reflectance 5110, a bottom reflectance 5112 and an envelope 5116 of the first central aperture signal 5100, as well as a slicer level 5114, the slicer level 5114 being the level of the central aperture signal derived during a so-called bit detection in the data recovery mechanism HFPR shown in FIG. 6. In this situation, the focusing has problems in keeping the spot 21 in focus in the event of e.g. an external disturbance like a shock or vibration, or a local disturbance on the optical disk 1. The focus servo system FOC, 24 is not able to respond sufficiently quick on these events. As a result, the central aperture signal 5100 shows fluctuations, which may be detected, as will be described below, from e.g. a variation of the top reflectance 5110, a variation of the bottom reflectance 5112 or a variation of the envelope 5116, or from a variation of the slicer level 5114.

FIG. 13B shows a second central aperture signal 5200 as a function of time for a suitable bandwidth and gain of the focus servo system FOC, 24 when reading a part of the optical disk 1 on which data is present. In this situation, the second central aperture signal 5200 is relatively stable, and has a substantially constant top reflectance 5210, bottom reflectance 5212, and envelope 5216 of the central aperture signal 5200, as well as a substantially constant slicer level 5214.

FIG. 13B also shows amplitudes of the central aperture signal 5200 generated by data with a short runlength and a long runlength within the data for a Blue-Ray disk. The amplitude of the central aperture signal 5200 generated by data with a short runlength of two is known as the I2-amplitude and indicated with arrow AI2. The amplitude of the central aperture signal 5200 generated by data with a long runlength of eight is known as the I8-amplitude and indicated with arrow AI8.

FIG. 13C shows a third central aperture signal 5300 as a function of time for a relatively high bandwidth and gain of the focus servo system FOC, 24 when reading a part of the optical disk 1 on which data is present. In this situation, the focusing has problems in keeping the spot 21 in focus in the event of e.g. an external disturbance like a shock or vibration, or a local disturbance on the optical disk. Such an event may incite an oscillation of the focus actuator 24. As a result, the third central aperture signal 5300 shows fluctuations, which may be detected from e.g. a variation of a top reflectance 5310, a bottom reflectance 5312, or an envelope 5316 of the central aperture signal 5300, or from a variation of a slicer level 5314 associated with bit detection.

FIG. 14 shows an exemplary embodiment of elements of a method according to the invention. The embodiment uses the different behaviour, illustrated in FIG. 13, of the central aperture signal HF as a function of relative bandwidth and gain of the focus servo system FOC, 24. The exemplary embodiment aims for optimizing the scanning performance by optimizing the bandwidth of the control of the focus actuator 24.

When the optical disk 1 already comprises data, e.g. the optical disk 1 is a read-only type disk with embossed data 140 or data 14 was already written to a recordable optical disk, the method determines 6000 a third performance indicator TIND1 from the central aperture signal HF. When the optical disk 1 does not comprise data, or does not comprise data at the position where the optical disk is being scanned, the method includes writing 6900 data to the optical disk 1 before determining 6000 the third performance indicator TIND1.

The third performance indicator TIND1 may e.g. be the variation of the envelope 5116, 5216, 5316 of the central aperture signal HF generated from the data on the optical disk 1 while the spot 21 is focused on the optical disk 1 with a focusing bandwidth and the spot 21 is tracking the track 3 with data, as shown in FIG. 13. The third performance indicator TIND1 may alternatively be e.g. the slicer level 5114, 5214, 5314 determined with bit detection on the data. The third performance indicator TIND1 may alternatively be any other suitable parameter measured on the data indicating a data quality, e.g. a parameter associated with reflection level variations, such as the top reflection level 5110, 5210, 5310 or bottom reflection level 5112, 5212, 5312, or a parameter associated with a spot size of the spot 21 effecting a resolving power of the spot, such as a ratio of amplitudes of short runlengths and long runlengths within the data, e.g. the ratio of the I2-amplitude AI2, as shown in FIG. 13, generated by marks with a runlength of two and the I8-amplitude AI8 generated by marks with a runlength of eight and longer from a Blue-Ray disk.

The third performance indicator TIND1 is compared against a third threshold TTHR1 for determining a third servo margin TMAR1 in block 6100. E.g., when the third performance indicator TIND1 is the variation of the envelope 5116, 5216, 5316 of the central aperture signal HF, the third threshold TTHR1 may be a maximum variation of the envelope.

Block 6200 then sets a bandwidth BW of the control of the servo actuator SACT in dependence on the third servo margin TMAR1 by setting a gain G of the control. E.g., when the bandwidth was high and the third servo margin TMAR1 derived from the envelope variation is small, associated with a large and relatively high-frequent variation of the envelope 5316 as in FIG. 13C, the bandwidth BW is reduced by reducing the gain G. E.g., when the bandwidth was low and the third servo margin TMAR1 derived from the envelope variation is small, associated with a large variation of the envelope 5116 as in FIG. 13A, the bandwidth BW is increased.

Determining the third performance indicator TIND1 and setting the bandwidth BW may be performed while reading data present on the optical disk 1. Determining the third performance indicator TIND1 and setting the bandwidth BW may alternatively be performed while writing data to the optical disk 1, using e.g. a variation of the envelope of the central aperture signal HF while writing data to the optical disk 1.

FIG. 15 shows another exemplary embodiment of elements of a method according to the invention. The exemplary embodiment aims for optimizing the scanning performance by setting the scanning velocity VEL in dependence on a the quality of retrieving data from the optical disk 1.

When the optical disk 1 already comprises data, e.g. the optical disk is a read-only type disk or data was already written to a recordable optical disk, the method determines 7000 a fourth performance indicator MIND1 from the central aperture signal HF, similar to the determining 6000 of the third performance indicator TIND1 described with reference to FIG. 14. When the optical disk 1 does not comprise data, or does not comprise data at the position where the optical disk 1 is being scanned, the method includes writing 7900 data to the optical disk before determining 7000 the fourth performance indicator MIND1. The fourth performance indicator MIND1 thus provides an indication of the quality of marks 14, 140 on the optical disk 1.

The fourth performance indicator MIND1 is compared against a fourth threshold MTHR1 for determining a fourth servo margin MMAR1 in block 7100. E.g., when the fourth performance indicator MIND1 is the variation of the envelope 5116, 5216, 5316 of the central aperture signal HF, the fourth threshold MTHR1 may be a maximum variation of the envelope.

Block 7200 then reduces the scanning velocity VEL in dependence on the fourth servo margin MMAR1. E.g., when the fourth servo margin MMAR1 derived from the envelope variation is low, associated with a large variation of the envelope as in FIG. 13C, the scanning velocity VEL is reduced.

Determining the fourth performance indicator MIND1 and setting the scanning velocity VEL may be performed while reading data present on the optical disk 1. Determining the fourth performance indicator MIND1 and setting the scanning velocity VEL may alternatively be performed while writing data to the optical disk.

Setting the scanning velocity VEL in dependence on the fourth servo margin MMAR1 associated with the mark quality of marks on the optical disks may be performed after setting the scanning velocity VEL in dependence on the first servo margin MAR1 associated with the servo error signal SES, either directly or indirectly via the servo control signal SCS. Alternatively, setting the scanning velocity VEL in dependence on the fourth servo margin MMAR1 may be performed without first determining the first servo margin MAR1 and without setting the scanning velocity VEL in dependence on the first servo margin MAR1.

The methods described with above may be performed once when a new optical disk 1 is loaded in the optical disk drive, or when a new session is started with an optical disk 1 already present in the optical disk drive.

Additionally or alternatively, the methods may be performed while the optical disk 1 is being scanned for reading data from the optical disk 1, or while the optical disk 1 is being scanned for writing data to the optical disk 1.

When the method is performed while the optical disk 1 is being scanned for writing data to the optical disk 1, writing may be stopped when the first servo margin MAR1 is within a pre-determined alarm range. The method may then e.g. be repeated while the optical disk 1 is being scanned for reading data from the optical disk 1 with an amended first servo margin for determining an amended scanning velocity. In a further embodiment, an alarm signal is generated in the optical disk drive when the first servo margin MAR1 is within a pre-determined warning range and writing at the scanning velocity VEL has stopped. Thus, when the optical disk drive performs an initial testing at read conditions, the servo actuator SACT would run into its limits during writing. When writing is stopped at the scanning velocity VEL, optionally an alarm signal is given to e.g. a host apparatus cooperating with the optical disk drive to signal to the host apparatus that writing at the scanning velocity VEL has been stopped.

The method may be performed in zones, which may be defined during scanning or which may alternatively be pre-defined.

An exemplary embodiment of a method applied with zones is described with reference to FIG. 16 and FIG. 10.

FIG. 16 shows optical disk 1 with a data area extending from an inner radius R24 at a radius of e.g. R=24.00 mm to an other radius R58 at a radius of e.g. R=58.00 mm on the optical disk 1. The optical disk may have an inner test area at an inner position relative to the inner radius R24, e.g. from R=22.00 mm to R=24.00 mm. The optical disk may have an additional outer test area at an outer position relative to the outer radius R58, e.g. from R=58.00 mm to R=58.20 mm.

A plurality of zones ZONE1, ZONE2, ZONE3, ZONE4 is defined on the optical disk 1. In this example, the zones ZONE1, ZONE2, ZONE3, ZONE4 of the plurality of zones are adjacent, but in alternatives embodiments, the zones ZONE1, ZONE2, ZONE3, ZONE4 may be separated by further areas. In this example, the zones ZONE1, ZONE2, ZONE3, ZONE4 are defined in the data area, but the zones may extend into at least one of the inner test area and the outer test area.

In this example, the scanning velocity VEL is an angular velocity of the optical disk 1, provided by the motor 23 controlled by the disk motor controller MOT.

The method starts with an initialization 2000 at a target velocity, which will further be referred to as VEL(1, target), for the first zone ZONE1. The target velocity is an angular velocity. The target velocity VEL(1, target) corresponds to a linear velocity VELLIN(1, target) at a first track within the first zone ZONE1.

A servo control signal SCS is determined in dependence on the servo error signal SES in 2100.

In blocks 2210, 2220 and 230, a plurality of first performance indicators IND1, IND2, IND3 is determined from the servo error signal SES and the servo control signal SCS. In this example, first performance indicator IND1 of the plurality of first performance indicators is determined as the maximum amplitude of the servo error signal SES, first performance indicator IND2 of the plurality of first performance indicators is determined as the peak amplitude of the servo control signal SCS, and first performance indicator IND3 of the plurality of first performance indicators is determined as the power of the servo control signal SCS.

In blocks 2310, 2320, 2330, the indicators IND1, IND2, IND3 are compared against corresponding thresholds ITHR1, ITHR2, ITHR3 for determining corresponding servo margins MAR1, MAR2, MAR3. The thresholds may be specific for the zone ZONE1, ZONE2, ZONE3, ZONE4, or the same thresholds may be used for each zone ZONE1, ZONE2, ZONE3, ZONE4.

Block 2400 receives the servo margins MAR1, MAR2 and MAR3 and sets the scanning velocity VEL to a value which will be further referred to as VEL(1, determined), denoting the angular velocity as determined by the method at the beginning of the first zone ZONE1. When all servo margins MAR1, MAR2, MAR3 are sufficiently large, the scanning velocity VEL is maintained at its current value, i.e. at the target velocity VEL(1, target). When at least one of the servo margins MAR1, MAR2 and MAR3 is insufficient, the scanning velocity VEL is reduced in dependence on the value of the servo margins MAR1, MAR2 and MAR3. Optionally, when a significant margin on the residual servo error is found, the bandwidth BW of control of the servo actuator SACT may be reduced. Optionally, a mark quality of marks on the optical disk 1 may be tested as described with reference to FIGS. 14 and 15, and when an insufficient margin TMAR1 or MMAR1 on the mark quality is found, the bandwidth BW of control of the servo actuator may be adapted, or the scanning velocity VEL may be adjusted accordingly.

After setting the scanning velocity in 2400, scanning the optical disk 1 is continued while continuously testing 2500 whether the next zone ZONE2 is entered. When entering the next zone ZONE2 at a larger radius, the method is initialized again in 2000 with the previously determined scanning velocity VEL(1, determined) as the target velocity for the zone ZONE2, i.e. as VEL(2, target). First performance indicators IND1, IND2 and IND3 are determined in 2210, 2220, 2230, servo margins MAR1, MAR2, MAR3 are determined from the first performance indicators IND1, IND2, IND3 in blocks 2310, 2320, 2330 for the new zone ZONE2 and the scanning velocity VEL is determined again in 2400. In this example, where the scanning velocity VEL is an angular velocity, when the margins determined in this next zone ZONE2 allow to maintain the scanning velocity VEL, the angular velocity VEL(2,determined) is thus maintained at its previous value VEL(1,determined) and the corresponding linear velocity VELLIN(2,determined) is increased with respect to its previous value VELLIN(1, determined), i.e.

VEL(2,determined)=VEL(1,determined), and

VELLIN(2,determined)>VELLIN(1,determined).

However, when the margins determined in this next zone ZONE2 require a reduction of the scanning velocity VEL, the scanning velocity VEL is reduced to an angular velocity corresponding to the linear velocity at the start of the previous zone ZONE1, which may be expressed as VELLIN(2,determined)=VELLIN(1,determined), and VEL(2,determined)<VEL(1,determined).

Optionally, when a significant margin on the residual servo error is found, the bandwidth BW of control of the servo actuator SACT may be reduced. Optionally, a mark quality of marks on the optical disk 1 may be tested as described with reference to FIGS. 14 and 15, and when an insufficient margin TMAR1 or MMAR1 on the mark quality is found, the bandwidth BW of control of the servo actuator SACT may be adapted, or the scanning velocity VEL may be further adjusted.

The scanning then continues until a next zone ZONE3 is entered, upon which entrance again the scanning velocity VEL is determined as VEL(3, determined) from servo margins in a manner similarly to that described upon entering ZONE2.

The scanning then continues until a next zone ZONE4 is entered, upon which entrance again the scanning velocity VEL is determined as VEL(4, determined) from servo margins in a manner similarly to that described upon entering ZONE2

Thus, in this example, when upon entering each new zone, ZONE2, ZONE3, ZONE4, all servo margins MAR1, MAR2, MAR3 are sufficiently large to maintain the scanning velocity VEL, the whole optical disk 1 is scanned with a single angular velocity VEL. The linear velocity is then increasing from the inner radius R24 to the outer radius R58. Only when at least one if the servo margins MAR1, MAR2, MAR3 becomes too small upon entering a new zone ZONE2, ZONE3 or ZONE4, the angular velocity is reduced. However, the corresponding linear velocity is never substantially smaller than the linear velocity determined in the first zone ZONE1. The optical disk 1 is thus scanned within acceptable servo margins with substantially the maximum possible scanning velocity.

In alternative embodiments, the linear velocity may, upon entering a new zone ZONE2, ZONE3 or ZONE4, also be reduced to a value smaller than the linear velocity determined in the previous zone.

Figure 17A:
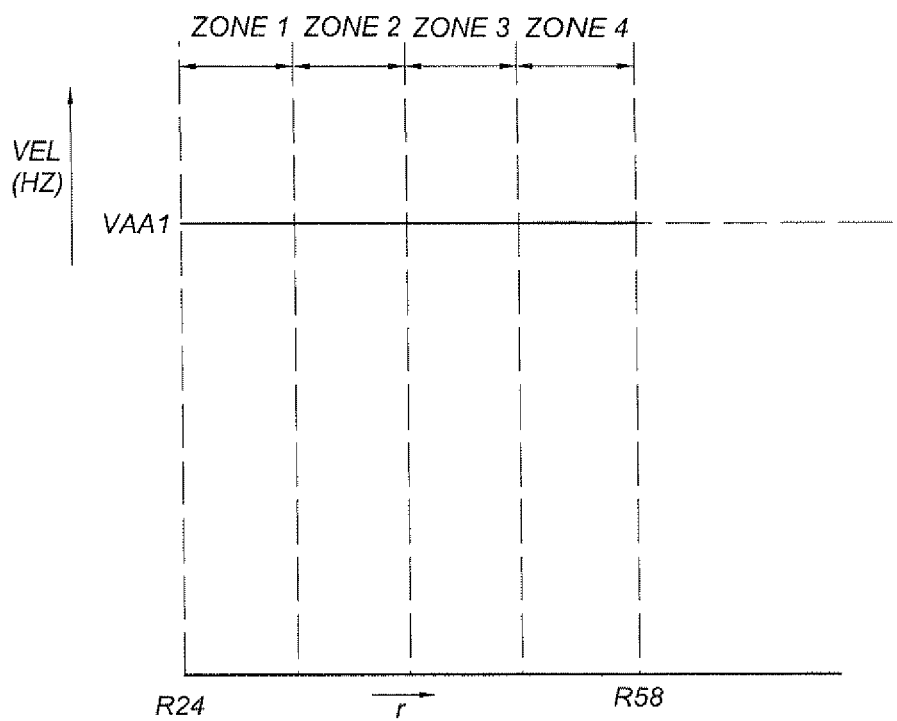
Figure 17B:
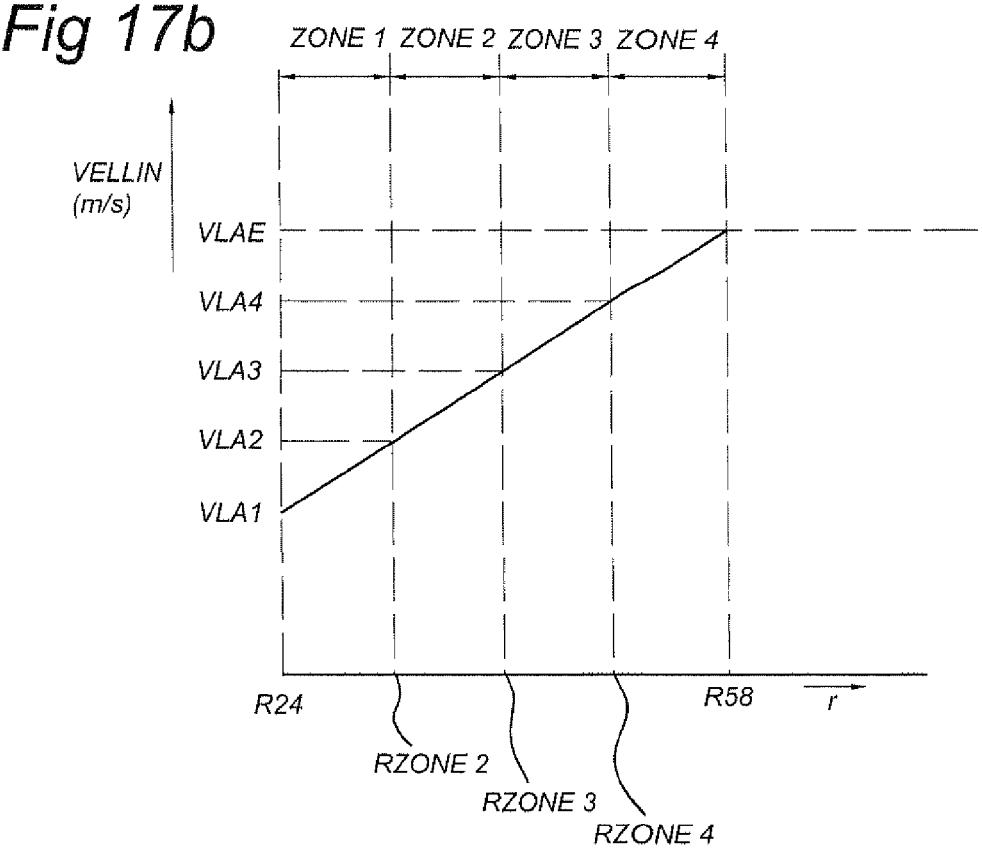
Figure 17C:
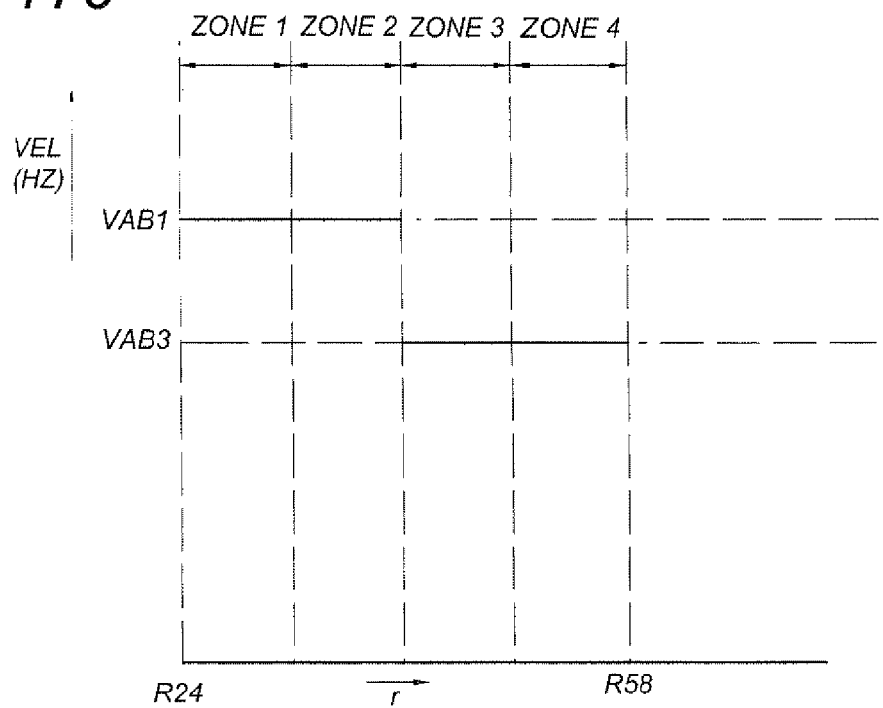

FIG. 17a-FIG. 17f show exemplary scanning velocity profiles associated with the embodiment of a method according to the invention using a plurality of zones ZONE1, ZONE2, ZONE3, ZONE4 as discussed above in reference with FIG. 16. In the example, zone ZONE1 starts at the inner radius R24, zone ZONE2 starts at radius RZONE2, zone ZONE3 starts at radius RZONE3, zone ZONE4 starts at radius RZONE4 and zone ZONE4 ends at the outer radius R58, FIG. 17a, FIG. 17c and FIG. 17e show exemplary scanning profiles of the scanning velocity VEL, determined as discussed with reference to FIG. 16 above. The scanning velocity VEL is an angular velocity in this example. The figures show the scanning velocity VEL expressed in Hz along the vertical axis, as a function of the radius R across the optical disk 1 along the horizontal axis. FIG. 17b, FIG. 17d and FIG. 17f show the corresponding profiles of the linear velocity. The figures show the linear velocity VELLIN expressed in m/s along the vertical axis, as a function of the radius R across the optical disk 1 along the horizontal axis. The linear velocity VELLIN is related to the scanning velocity LIN at a radius R as $$VELLIN = VEL \times 2 \times \pi \times R.$$

FIG. 17a and FIG. 17b show exemplary profiles for an optical disk drive with an optical disk 1 where, upon entering each of the zones ZONE1, ZONE2, ZONE3, ZONE4, all servo margins MAR1, MAR2, MAR3 are sufficiently large to maintain the scanning velocity VEL at an target value VAA1. The target value VAA1 may e.g. be set as the maximum rotational frequency of the disk motor 23.

Upon entry of the first zone ZONE1 at a radius R24, the scanning velocity VEL is thus determined as $$VEL(1, determined) = VEL(1, target) = VAA1.$$

At the radius R24, the scanning velocity VAA1 corresponds to a linear velocity VLA1, the linear velocity VLA1 being related to the scanning velocity VAA1 as $$VELLIN(1, determined) = VLA1 = VAA1 \times 2 \times \pi \times R24.$$

Upon entry of the next zone ZONE2, VEL(2, target) is set to VAA1. As again all servo margins MAR1, MAR2, MAR3 are sufficiently large to maintain the scanning velocity VEL at an target value VAA1, the scanning velocity VEL is thus determined as $$VEL(2, determined) = VEL(2, target) = VAA1,$$

and the corresponding linear velocity at a radius RZONE2 corresponding to entry position of ZONE2 is determined as $$VELLIN(2, determined) = VLA2 = VAA1 \times 2 \times \pi \times RZONE2.$$

Similarly, $$VEL(3, determined) = VAA1,$$

$$VELLIN(3, determined) = VLA3,$$

$$VEL(4, determined) = VAA1, \text{ and}$$

$$VELLIN(4, determined) = VLA4.$$

At the end of the last zone ZONE4, the scanning velocity VEL is still maintained as VAA1, and the linear velocity corresponds to $$VLAE = VAA1 \times 2 \times \pi \times R58.$$

Hence, in this example, the optical disk 1 can be scanned with the optical disk drive at a constant angular velocity VAA1. When the target value VAA1 was chosen as the maximum rotational frequency of the disk motor 23, the optical disk 1 is thus scanned with the maximum scanning velocity that the optical disk drive can support.

FIG. 17c and FIG. 17d show exemplary profiles for an optical disk drive with an optical disk 1 where, upon entering zone ZONE3, one of the margins MAR1, MAR2, MAR3 is too small to maintain the scanning velocity VEL at an target value VAB1, and the scanning velocity VEL is reduced to a smaller velocity VAB3.

Hence in the example of FIG. 17c and FIG. 17d, when scanning starts at radius R24, as well as upon entry of ZONE2, all servo margins MAR1, MAR2, MAR3 are sufficiently large to maintain the scanning velocity VEL at an target value VAB1. Hence, $$VEL(1, determined) = VAB1,$$

$$VELLIN(1, determined) = VLB1,$$

$$VEL(2, determined) = VAB1, \text{ and}$$

$$VELLIN(2, determined) = VLB2 = VAB1 \times 2 \times \pi \times RZONE2.$$

At the end of zone ZONE2, the linear velocity is VLB2E.

Upon entry of the next zone ZONE3, one of the margins MAR1, MAR2, MAR3 results in reducing the scanning velocity VEL. As described above, reducing the scanning velocity VEL is performed by setting the linear velocity at the entry of zone ZONE3 to the linear velocity that was determined at the entry of zone ZONE2, hence $$VELLIN(3, determined) = VELLIN(2, determined) = VLB2.$$

The corresponding scanning velocity VEL is thus determined as $$VEL(3, determined) = VELLIN(3, determined)/(2 \times \pi \times RZONE3),$$

and is indicated as value VAB3 in FIG. 17c.

Upon entry of the next zone ZONE4, all servo margins MAR1, MAR2, MAR3 are again sufficiently large to maintain the scanning velocity VEL, hence, $$VEL(4, determined) = VAB3 \text{ and}$$

$$VELLIN(4, determined) = VLB4 = VAB3 \times 2 \times \pi \times RZONE4.$$

When scanning the optical disk 1 further, the scanning velocity VEL is maintained at value VAB3, and the linear velocity VELLIN increases linearly to $$VLBE = VAB3 \times 2 \times \pi \times R58$$

at the outer radius R58.

This example thus shows a situation where the scanning velocity VEL is reduced once, i.e. at the entry of zone ZONE3 of the optical disk 1.

FIG. 17e and FIG. 17f show exemplary profiles for an optical disk drive with a further optical disk 1 where only upon entering zone ZONE4, one of the margins MAR1, MAR2, MAR3 is too small to maintain the scanning velocity VEL at a target value VAC1, and the scanning velocity VEL is reduced to a smaller velocity VAC4 upon entry of zone ZONE4.

With reference to the velocities indicated in FIG. 17e and FIG. 17f, the scanning velocity VEL and corresponding linear velocity VELLIN are determined in this example as:

$$VEL(1, determined) = VEL(2, determined) = VEL(3, determined) = VAC1,$$

$$VELLIN(1, determined) = VLC1 = VAC1 \times 2 \times \pi \times R24,$$

$$VELLIN(2, determined) = VLC1 = VAC1 \times 2 \times \pi \times RZONE2,$$

$$VELLIN(3, determined) = VLC3 = VAC1 \times 2 \times \pi \times RZONE3,$$

$$VELLIN(4, determined = VLC3 < VLC3E, \text{ and}$$

$$VEL(4, determined) = VAC4 = VLC3/(2 \times \pi \times RZONE4).$$

Hence, with the further optical disk 1 in the optical disk drive, a larger scanning velocity VEL can be maintained than on the optical disk associated with FIG. 17c and FIG. 17d in the optical disk drive.

In the example, determining the scanning velocity VEL is performed upon entering a zone ZONE1, ZONE2, ZONE3, ZONE4 while scanning the optical disk for reading data. Determining the scanning velocity VEL may additionally or alternatively be performed upon entering a zone ZONE1, ZONE2, ZONE3, ZONE4 while scanning the optical disk 1 for writing data. Alternatively, determining the scanning velocity VEL may be performed for each zone ZONE1, ZONE2, ZONE3, ZONE4 prior to scanning the optical disk 1, and the determined scanning velocities VEL(1, determined), VEL(2, determined), VEL(3, determined), VEL(4, determined) for each zone ZONE1, ZONE2, ZONE3, ZONE4 are stored, e.g. in the optical disk drive or on the optical disk 1, for use while scanning the optical disk 1 with the optical disk drive.

The methods according to the invention may be used with any suitable scanning mode. E.g., the methods may be used using a constant linear velocity mode as scanning mode, setting the linear velocity to adjusted values when the margins indicate that the linear velocity is too large. Alternatively, the methods may be used with a constant angular velocity as scanning mode, setting the angular velocity to adjusted values when the margins indicate that the angular velocity is too large. Alternatively, the methods may be used with a zoned constant angular velocity as scanning mode.

The methods described above may be implemented in an optical disk drive, preferably in the processor CON, or system controller SYSCON of the optical disk drive, or in an apparatus cooperating with an optical disk drive and communicating with the processor CON or system controller SYSCON over the interface 79.

In FIG. 18, an overview is given of a computer arrangement that can be used to carry out the method according to the invention. The arrangement comprises a processor 601 for carrying out arithmetic operations.

The processor 601 is connected to a plurality of memory components, including a hard disk 605, Read Only Memory (ROM) 607, Electrically Erasable Programmable Read Only Memory (EEPROM) 609, and Random Access Memory (RAM) 611. Not all of these memory types need necessarily be provided. Moreover, these memory components need not be located physically close to the processor 601 but may be located remote from the processor 601.

The processor 601 is also connected to means for inputting instructions, data etc. by a user, like a keyboard 613, and a mouse 615. Other input means, such as a touch screen, a track ball and/or a voice converter, known to persons skilled in the art may be provided too.

A reading unit 617 connected to the processor 601 is provided. The reading unit 617 is arranged to read data from and possibly write data on a data carrier like a floppy disk 619 or a CD 621. Other data carriers may be tapes, DVD, BD, etc. as is known to persons skilled in the art.

The processor 601 is also connected to a printer 623 for printing output data on paper, as well as to a display 603, for instance, a cathode-ray tube monitor or a LCD (Liquid Crystal Display) screen, or any other type of display known to persons skilled in the art.

The processor 1 may be connected to a communication network 627, for instance, the Public Switched Telephone Network (PSTN), a Local Area Network (LAN), a Wide Area Network (WAN), etc. by means of I/O means 625. The processor 601 may be arranged to communicate with other communication arrangements through the network 627.

The data carrier 619, 621 may comprise a computer program product in the form of data and instructions arranged to provide the processor with the capacity to perform a method in accordance with the invention. However, such computer program product may, alternatively, be downloaded via the telecommunication network 627.

The processor 601 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 601 through the network 627.

It should be noted that the above-mentioned embodiments illustrate rather than limit the invention, and that those skilled in the art will be able to design many alternative embodiments without departing from the scope of the appended claims. E.g., a digital signal may be used where an analogue signal is suggested and vice versa, without departing from the scope of the invention and the appended claims. Embodiments may be combined to form further embodiments. Also, the invention may be analogously applied for e.g. other disk types and other optical disk drive configurations than those explicitly described in the embodiments above. In the claims, any reference signs and symbols placed between parentheses shall not be construed as limiting the claim.

The invention claimed is:

1. An optical disk drive for scanning an optical disk comprising a substantially circular track with a scanning velocity, the optical disk drive comprising:
    an optical source for generating an incident beam,
    an optical arrangement for focusing the incident beam into a spot on the optical disk,
    a disk speed controller for moving the optical disk with the scanning velocity relative to the spot,
    a servo system for controlling the position of the spot relative to the optical disk,
    a sensor for sensing a reflected beam produced by the optical disk upon receiving the incident beam, and for producing a sensor output signal comprising at least a servo error signal,
    the servo system comprising a servo controller and a servo actuator, and
    the servo controller being arranged to:
        receive the servo error signal,
        determine a first performance indicator of the servo actuator in dependence on at least the servo error signal while the spot is focused at a read power level,
        compare the first performance indicator against a first pre-determined threshold for determining a first servo margin, and
        set the scanning velocity in dependence on at least the first servo margin and only after setting the scanning velocity in dependence on at least the first servo margin, the optical disk is scanned for writing marks on the optical disk.

2. Optical disk drive according to claim 1, wherein the servo controller is further arranged to:
    determine a servo control signal in dependence on the servo error signal,
    control the servo actuator in dependence on the servo control signal, and
    perform the determining of the first performance indicator of the servo actuator while controlling the servo actuator with the servo control signal.

3. Optical disk drive according to claim 2, wherein the servo controller (SCON) is arranged to:
perform the determining of the first performance indicator (IND1) from the servo control signal (SCS).

4. Optical disk drive according to claim 1, wherein the servo error signal is a focus error signal and determining the first performance indicator is performed after the spot is focused on the disk.

5. Optical disk drive according to claim 2, wherein the servo error signal is a focus error signal, the servo control signal is a focus control signal, and determining the first performance indicator is performed while the spot is focused on the disk.

6. Optical disk drive according to claim 1, wherein the servo error signal (SES) is a tracking error signal (TE) and determining the first performance indicator (IND1) is performed while the spot (21) is focused on the disk (1) and before tracking the track (3).

7. Optical disk drive according to claim 2, wherein the servo error signal (SES) is a tracking error signal (TE) and the servo control signal (SCS) is a tracking control signal (31 a), and determining the first performance indicator (IND1) is performed while the spot (21) is focused on the disk (1) and tracking the track (3).

8. Optical disk drive according to claim 1, wherein determining the first performance indicator and comparing the first performance indicator against the first pre-determined threshold for determining the first servo margin
is also performed while the optical disk is scanned for writing marks on the optical disk, and
writing marks on the optical disk at the scanning velocity is stopped when the first servo margin is within a pre-determined alarm range.

9. Optical disk drive according to claim 1, wherein the optical disk drive is further arranged to, after the optical disk is scanned for writing marks on the optical disk:
determine a mark quality of the marks,
compare the mark quality against a pre-determined mark quality threshold for determining a mark-related servo margin, and
reduce the scanning velocity in dependence on the mark-related servo margin.

10. Optical disk drive according to claim 1, wherein the first performance indicator is associated with a bandwidth of the servo system.

11. Optical disk drive according to claim 1, wherein the first performance indicator (IND1) is associated with a dissipation of the servo actuator (SACT).

12. Optical disk drive according to claim 1, wherein the first performance indicator (IND1) is associated with a sensitivity of the servo actuator (SACT).

13. An optical disk drive for scanning an optical disk comprising a substantially circular track with a scanning velocity and a plurality of zones is defined on the optical disk, the optical disk drive comprising:
an optical source for generating an incident beam,
an optical arrangement for focusing the incident beam into a spot on the optical disk
a disk speed controller for moving the optical disk with the scanning velocity relative to the spot,
a servo system for controlling the position of the spot relative to the optical disk,
a sensor for sensing a reflected beam produced by the optical disk upon receiving the incident beam, and for producing a sensor output signal comprising at least a servo error signal,
the servo system comprising a servo controller and a servo actuator, and
the servo controller being arranged to:
receive the servo error signal,
determine a first performance indicator of the servo actuator in dependence on at least the servo error signal,
compare the first performance indicator against a first pre-determined threshold for determining a first servo margin, and
set the scanning velocity in dependence on at least the first servo margin, wherein
determining the first performance indicator, comparing the first performance indicator against the first pre-determined threshold for determining the first servo margin and setting the scanning velocity in dependence on at least the first servo margin is performed for each zone.

14. Optical disk drive according to claim 1, wherein
setting the scanning velocity in dependence on at least the first servo margin comprises setting the scanning velocity to a reduced scanning velocity, and
the servo controller is further arranged to, after setting the scanning velocity to the reduced scanning velocity:
determine the first performance indicator of the servo actuator again at the reduced scanning velocity,
compare the first performance indicator against the first pre-determined threshold again for determining an amended servo margin, and
set the scanning velocity in dependence on at least the amended servo margin.

15. Optical disk drive according to claim 1, wherein the first pre-determined threshold is associated with a first allowable performance of the servo system for scanning the optical disk with the scanning velocity.

16. An optical disk drive for scanning an optical disk comprising a substantially circular track with a scanning velocity, the optical disk drive comprising:
an optical source for generating an incident beam,
an optical arrangement for focusing the incident beam into a spot on the optical disk
a disk speed controller for moving the optical disk with the scanning velocity relative to the spot,
a servo system for controlling the position of the spot relative to the optical disk,
a sensor for sensing a reflected beam produced by the optical disk upon receiving the incident beam, and for producing a sensor output signal comprising at least a servo error signal,
the servo system comprising a servo controller and a servo actuator, and
the servo controller being arranged to:
receive the servo error signal,
determine a first performance indicator of the servo actuator in dependence on at least the servo error signal,
compare the first performance indicator against a first pre-determined threshold for determining a first servo margin,
set the scanning velocity in dependence on at least the first servo margin,
determine a servo control signal in dependence on the servo error signal,
control the servo actuator in dependence on the servo control signal,
perform the determining of the first performance indicator of the servo actuator while controlling the servo actuator with the servo control signal, determine a second performance indicator of the servo actuator from at least one of the servo error signal and the servo control signal while controlling the servo actuator with the servo control signal, compare the second performance indicator against a second pre-determined threshold for determining a second servo margin, and set a bandwidth of the control of the servo actuator in dependence on at least the second servo margin.

17. Optical disk drive according to claim 16, wherein the second performance indicator is associated with at least one of:
a bandwidth of the servo system,
a dissipation of the servo actuator, and
a sensitivity of the servo actuator.

18. Optical disk drive according to claim 16, wherein a plurality of zones is defined on the optical disk and
determining the second performance indicator, comparing the second performance indicator against the second pre-determined threshold for determining the second servo margin and setting the bandwidth in dependence on at least the second servo margin
is performed for each zone.

19. An optical disk drive for scanning an optical disk comprising a substantially circular track) with a scanning velocity, the optical disk drive comprising:
an optical source for generating an incident beam,
an optical arrangement for focusing the incident beam into a spot on the optical disk,
a disk speed controller for moving the optical disk with the scanning velocity relative to the spot,
a servo system for controlling the position of the spot relative to the optical disk,
a sensor for sensing a reflected beam produced by the optical disk upon receiving the incident beam, and for producing a sensor output signal comprising at least a servo error signal and a central aperture signal,
the servo system comprising a servo controller and a servo actuator, and
the servo controller being arranged to:
receive the servo error signal,
determine a first performance indicator of the servo actuator in dependence on at least the servo error signal,
compare the first performance indicator against a first pre-determined threshold for determining a first servo margin,
set the scanning velocity in dependence on at least the first servo margin,
determine a servo control signal in dependence on the servo error signal,
control the servo actuator in dependence on the servo control signal,
perform the determining of the first performance indicator of the servo actuator while controlling the servo actuator with the servo control signal,
determine a third performance indicator of the servo actuator from the central aperture signal while controlling the servo actuator with the servo control signal,
compare the third performance indicator against a third pre-determined threshold for determining a third servo margin, and
set a bandwidth of the control of the servo actuator in dependence on at least the third servo margin.

20. Optical disk drive according to claim 19, wherein the third performance indicator is associated with at least one of:
a mark quality of marks on the optical disk,
a variation of a reflection level of the optical disk, and
a variation of an envelope of the central aperture signal.

21. Optical disk drive according to claim 19, wherein a plurality of zones is defined on the optical disk and
determining the third performance indicator, comparing the third performance indicator against the third pre-determined threshold for determining the third servo margin and setting the bandwidth in dependence on at least the third servo margin
is performed for each zone.

22. Optical disk drive according to claim 19, wherein determining the third performance indicator is performed while the optical disk is scanned for writing marks on the optical disk.

23. A method for scanning an optical disk comprising a substantially circular track for use with an optical disk drive for scanning the optical disk, the method comprising:
generating an incident beam,
focusing the incident beam into a spot on the optical disk,
moving the optical disk with the scanning velocity relative to the spot,
controlling the position of the spot relative to the optical disk using a servo actuator,
sensing a reflected beam produced by the optical disk upon receiving the incident beam, and producing a sensor output signal comprising at least a servo error signal upon sensing the reflected beam, and
receiving the servo error signal,
determining a servo control signal in dependence on the servo error signal,
controlling the servo actuator in dependence on the servo control signal,
determining a first performance indicator of the servo actuator in dependence on the servo error signal while controlling the servo actuator with the servo control signal,
comparing the first performance indicator against a first pre-determined threshold for determining a first servo margin,
setting the scanning velocity in dependence on at least the first servo margin,
determining a second performance indicator of the servo actuator from at least one of the servo error signal and the servo control signal while controlling the servo actuator with the servo control signal,
comparing the second performance indicator against a second pre-determined threshold for determining a second servo margin, and
setting a bandwidth of the control of the servo actuator in dependence on the second servo margin.

24. Method according to claim 23, comprising:
performing the determining of the first performance indicator from the servo control signal.

25. A method for scanning an optical disk comprising a substantially circular track for use with an optical disk drive for scanning the optical disk, the method comprising:
generating an incident beam,
focusing the incident beam into a spot on the optical disk,
moving the optical disk with the scanning velocity relative to the spot,
controlling the position of the spot relative to the optical disk using a servo actuator,
sensing a reflected beam produced by the optical disk upon receiving the incident beam, and producing a sensor output signal comprising at least a servo error signal and a central aperture signal upon sensing the reflected beam, and receiving the servo error signal,
determining a servo control signal in dependence on the servo error signal,
controlling the servo actuator in dependence on the servo control signal,
determining a first performance indicator of the servo actuator in dependence on the servo error signal while controlling the servo actuator with the servo control signal,
comparing the first performance indicator against a first pre-determined threshold for determining a first servo margin,
setting the scanning velocity in dependence on at least the first servo margin,
determining a third performance indicator of the servo actuator from the central aperture signal while controlling the servo actuator with the servo control signal,
comparing the third performance indicator against a third pre-determined threshold for determining a third servo margin, and
setting a bandwidth of the control of the servo actuator in dependence on the third servo margin.

* * * * *